United States Patent
Ren et al.

(10) Patent No.: US 9,928,602 B2
(45) Date of Patent: Mar. 27, 2018

(54) FAST AND AUTOMATED SEGMENTATION OF LAYERED IMAGE WITH HEURISTIC GRAPH SEARCH

(71) Applicant: Novartis AG, Basel (CH)

(72) Inventors: Hugang Ren, Cypress, CA (US); Lingfeng Yu, Rancho Santa Margarita, CA (US)

(73) Assignee: Novartis AG, Basel (CH)

( * ) Notice: Subject to any disclaimer, the term of this patent is extended or adjusted under 35 U.S.C. 154(b) by 233 days.

(21) Appl. No.: 14/966,694

(22) Filed: Dec. 11, 2015

(65) Prior Publication Data

US 2017/0169573 A1    Jun. 15, 2017

(51) Int. Cl.
| | | |
|---|---|---|
| *G06K 9/00* | (2006.01) | |
| *G06T 7/00* | (2017.01) | |
| *G06T 7/40* | (2017.01) | |
| *G06T 7/13* | (2017.01) | |
| *G06T 7/162* | (2017.01) | |
| *G06T 7/181* | (2017.01) | |

(52) U.S. Cl.
CPC .......... *G06T 7/0093* (2013.01); *G06T 7/0083* (2013.01); *G06T 7/13* (2017.01); *G06T 7/162* (2017.01); *G06T 7/181* (2017.01); *G06T 7/408* (2013.01); *G06T 2207/10101* (2013.01); *G06T 2207/10132* (2013.01); *G06T 2207/20016* (2013.01); *G06T 2207/20136* (2013.01); *G06T 2207/30041* (2013.01)

(58) Field of Classification Search
CPC  G06T 2207/10101; G06T 2207/30041; G06K 2209/05
See application file for complete search history.

(56) References Cited

U.S. PATENT DOCUMENTS

| | | | |
|---|---|---|---|
| 8,801,187 B1 * | 8/2014 | Knighton | A61B 3/102 345/418 |
| 2007/0058865 A1 * | 3/2007 | Li | G06K 9/4638 382/173 |

(Continued)

OTHER PUBLICATIONS

Chiu et al ("Automatic Segmentation of sevel retinal layers in SDOCT images congruent with expert manual segmentation", 2010).*

(Continued)

*Primary Examiner* — Avinash Yentrapati
(74) *Attorney, Agent, or Firm* — S. Brannon Latimer

(57) ABSTRACT

A method of processing an ophthalmic image includes: taking an image of an ophthalmic region involving an ophthalmic layer by an imaging system; constructing an image graph, comprising nodes connected by links and detected image data by an image processor; and performing a heuristic graph-search for a path on the image graph that corresponds to an image of the ophthalmic layer by assigning at least one of link-costs to links of the image graph and node-costs to nodes of the image graph; assigning heuristic-costs to at least one of the nodes and the links; creating extended paths by extending a selected path with extension links; determining path-costs of the extended paths by combining heuristic costs and at least one of link-costs and node-costs assigned to the extension-links; and selecting the extended path with the smallest path-cost.

22 Claims, 21 Drawing Sheets

(56) References Cited

U.S. PATENT DOCUMENTS

| | | | |
|---|---|---|---|
| 2007/0287932 A1* | 12/2007 | Huang | A61B 3/1005 600/558 |
| 2008/0317308 A1* | 12/2008 | Wu | G06K 9/4638 382/128 |
| 2009/0136103 A1* | 5/2009 | Sonka | G06K 9/4638 382/128 |
| 2009/0244485 A1 | 10/2009 | Walsh et al. | |
| 2010/0189333 A1* | 7/2010 | Beck | E06B 5/161 382/131 |
| 2011/0182517 A1* | 7/2011 | Farsiu | A61B 5/0066 382/190 |
| 2013/0181976 A1* | 7/2013 | Dastmalchi | A61B 3/102 345/419 |
| 2013/0216116 A1* | 8/2013 | Yim | G06T 7/0093 382/131 |
| 2015/0110377 A1* | 4/2015 | Yim | G06T 7/0093 382/131 |
| 2015/0124216 A1* | 5/2015 | Abramoff | A61B 3/102 351/206 |
| 2016/0035088 A1* | 2/2016 | Abramoff | G06T 7/0012 382/128 |

OTHER PUBLICATIONS

Vincente ("Graph cut based image segmentation with connectivity prior", 2008).*

"A* search algorithm", Oct. 4, 2012, retrieved from the Internet: URL:http://en.wikipedia.org/wiki/A*_searchalgorithm.

Chiu et al., "Automatic segmentation of seven retinal layers in SDOCT images congruent with expert manual segmentation", Optics Express, vol. 18, No. 18, Aug. 30, 2010, pp. 19413-19428.

Li et al., "Retinal Vessel Detection and Measurement for Computer-aided Medical Diagnosis", Journal of Digital Imaging, vol. 27, No. 1, Oct. 1, 2014; pp. 120-132.

Martelli, "An Application of Heuristic Search Methods to Edge and Contour Detection", Communications of the ACM, Association for Computing Machinery, Inc., United States, vol. 19, No. 2, Feb. 1, 1976, pp. 73-83.

Yang et al., "Automated segmentation of outer retinal layers in macular OCT images of patients with retinitis pigmentosa", Biomedical Optics Express, Aug. 1, 2011, pp. 2493-2503.

Ho et al., "Optical coherence tomography in the detection of retinal break and management of retinal detachment in morning glory syndrome", Acta Ophthalmol Scandinavica, 2006, 84(2), 225-227.

Kawazoe et al., "Evaluation of a partial retinal surface tear by optical coherence tomography", Clinical Ophthalmology, 2011, 5, 733-734.

Wong et al., "Dye Extrusion Technique (De-Tech); Occult Retinal Break Detection With Subretinal Dye Extrusion During Vitrectomy for Retinal Detachment Repair", Retina, 2009, 29:4, 492-496.

Chiu et al., "Automatic segmentation of seven retinal layers in SDOCT images congruent with expert manual segmentation," Optics Express, 18(18), 19413-19428, (2010).

Fabritius et al., "Automated segmentation of the macula by optical coherence tomography," Optics Express 17(18), 15659-15669, (2009).

Götzinger et al., Retinal pigment epithelium segmentation by polarization sensitive optical coherence tomography, Optics Express, 16(21), 16410-16422, (2008).

International Search Report and Written Opinion issued for corresponding International Application No. PCT/US2015/031070, dated Aug. 18, 2015, 9 pgs.

Yang et al., "Automated layer segmentation of macular OCT images using dual-scale gradient information," Opt. Express 18(20), 21293-21307, (2010).

Yazdanpanah et al., Segmentation of Intra-Retinal Layers from Optical Coherence Tomography Images using an Active Contour Approach, IEEE Med. Imaging, 30(2):484-495, (2011).

Zawadzki et al., Adapatation of a support vector machine algorithm for segmentation and visualization of retinal structures in volumetric optical coherence tomography data sets, J Biomed Opt, 12(4):041206, (2007).

* cited by examiner

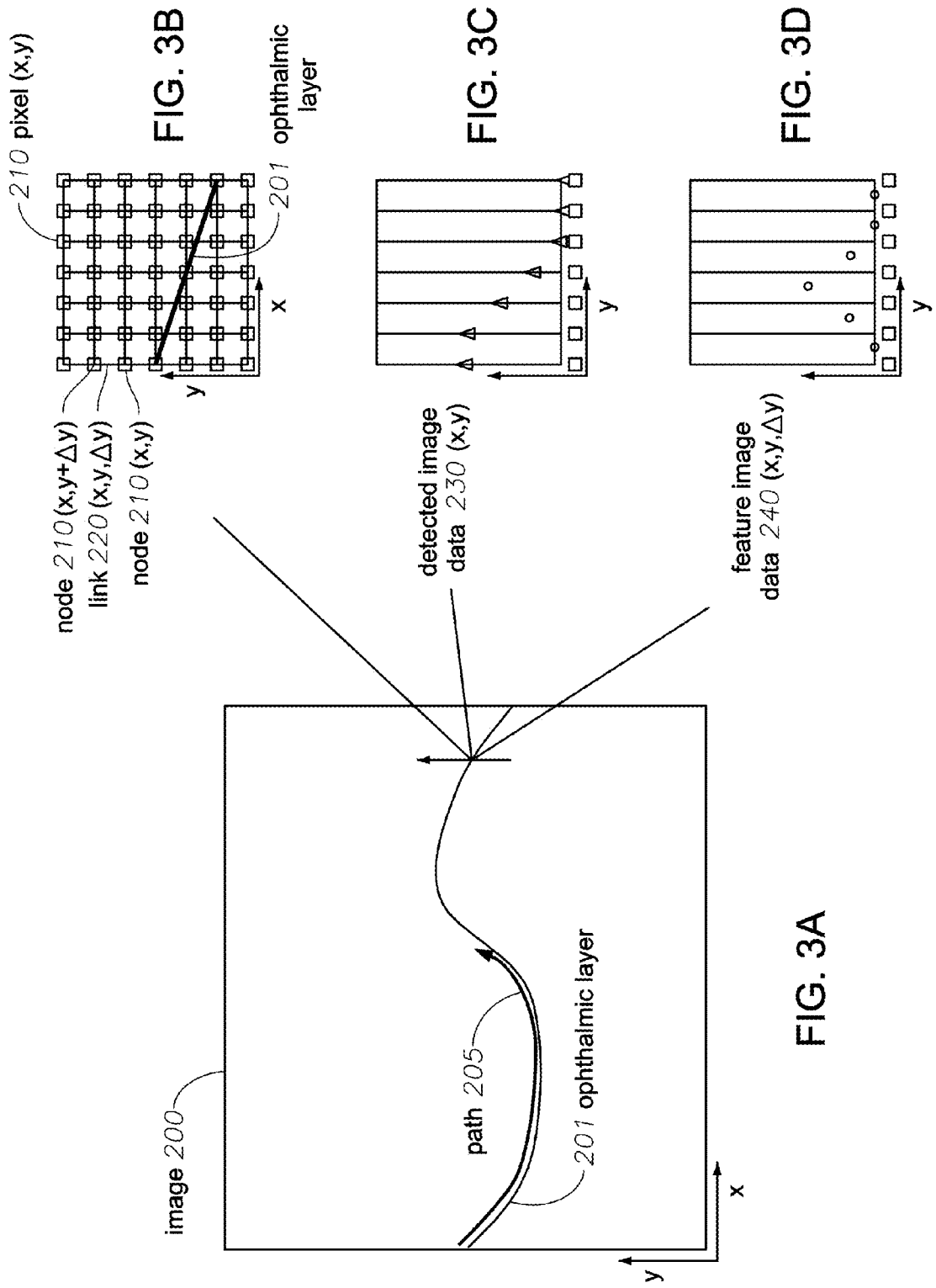

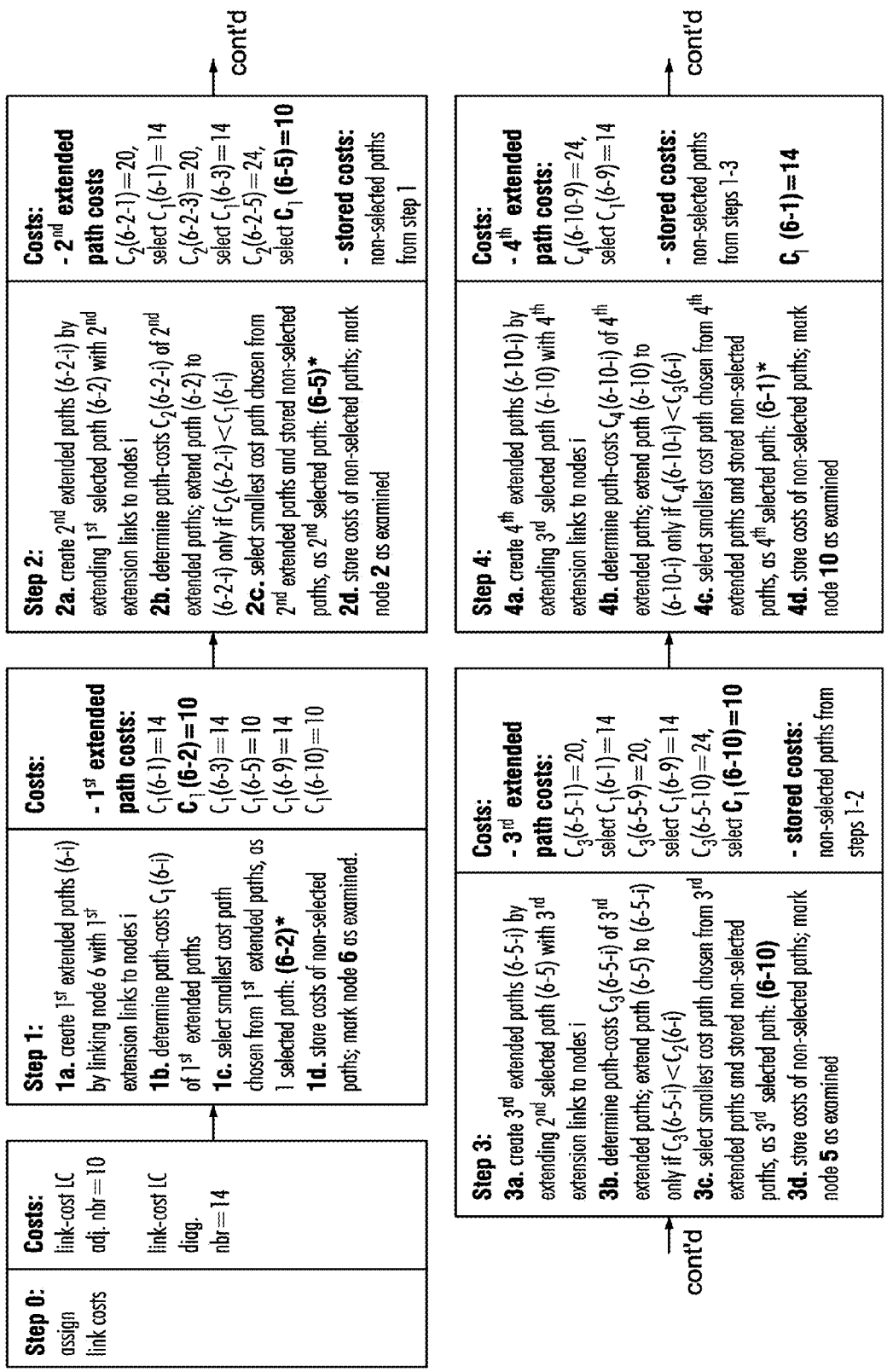

FAST AND AUTOMATED SEGMENTATION OF LAYERED IMAGE WITH HEURISTIC GRAPH SEARCH

TECHNICAL FIELD

This patent document related to graph searches of layered images. In more detail, this patent document relates to fast and automated segmentation of layered images with heuristic graph searches.

BACKGROUND

Image segmentation is critical for quantitative medical imaging and image guided surgical interventions. For instance, in order to provide computer-implemented diagnostic information, quantification of tissue features, such as their thickness, volume, reflectivity, and texture, can be important. In general, the quality of the diagnostic information can be improved by incorporating image recognition functionalities. A particular challenge of image recognition is to identify the boundary layers of the imaged tissues accurately. Identifying the layers in an image is sometimes also referred to as image segmentation.

Beyond diagnostics, another medical area where image segmentation can be very useful is the emerging field of image guided surgical interventions. High quality image segmentation that involves delineating the boundaries of the layered target pathology with high accuracy can improve the outcomes of the surgery substantially. Improved surgical outcomes include lower reoccurrence rates, shorter operation or procedure times, and achieving the surgical goals in a higher percent of the cases.

Layered medical images are typical in ophthalmology, including images of the retina, cornea and the capsule of the nucleus. One of the imaging technologies, the so-called optical coherence tomography, or OCT, demonstrated particularly fast progress in precision, utility and imaging time. OCT is on its way to become one of the most widely used imaging technique in ophthalmology, even approaching the status of the new clinical standard.

Recently, several OCT image segmentation algorithms have been developed. However, these methods are mainly for post processing the images and as such, are not particularly fast. Moreover, these algorithms tend to be limited in their utility. Techniques like "region growing" and "active contour" methods are suitable for segmenting irregular boundaries. However, both require initial seeds to start with and therefore are only semi-automatic. "Support vector machine" and "artificial neural network" methods are computation intensive and require large training data sets. Threshold based approaches are sensitive to intensity variations and require continuous threshold adjustments. Polarization based method rely on a specially designed polarization sensitive hardware system and are therefore not cost effective. Finally, recently proposed graph-based shortest path searches show promise in OCT image segmentation. However, they rely on a complex graph search algorithm that slows down the processing speed, and are thus not suitable for real-time image segmentation. Therefore, there is a need for fast, automated image segmentation algorithms for ophthalmic imaging applications.

SUMMARY

Embodiments in this patent document address the above challenges by introducing a heuristic cost as a further guiding force for graph searches of the ophthalmic layer in the image. With the extra heuristic information, unique to layered images, the graph search can be guided efficiently and the processing speed can be increased substantially.

Embodiments of the method of processing an ophthalmic image with a heuristic search can include: detecting image data of an ophthalmic region involving an ophthalmic layer by an imaging system; constructing an image graph, comprising nodes connected by links and the detected image data corresponding to at least one of the nodes and links, by an image processor from the image; and performing a heuristic graph-search for a path on the image graph that corresponds to an image of the ophthalmic layer by assigning at least one of link-costs to links of the image graph and node-costs to nodes of the image graph; assigning heuristic-costs to at least one of the nodes and the links of the image graph; (a) creating extended paths by extending a selected path from its front node with extension links; (b) determining path-costs of the extended paths by combining heuristic costs of the extended paths with chain costs of the extended paths, wherein the heuristic cost of a path is the heuristic cost of its front node, and the chain cost of a path is one of a sum of the link-costs of the links of the path, a sum of the node-costs of the nodes of the path, and a weighted sum of the link-costs and node-costs of the links and nodes of the path; (c) selecting a lowest cost path, chosen from the extended paths and from stored non-selected paths, as an updated selected path; (d) storing non-selected extended paths and their costs, and marking the front node of the selected path as examined; wherein the steps (a)-(d) are repeated iteratively.

In some embodiments, a method of processing an ophthalmic image can include: detecting image data of an ophthalmic region involving an ophthalmic layer by an imaging system; using an image processor to construct an image graph, comprising nodes connected by links and the detected image data corresponding to at least one of the nodes and links, from the image; and performing a heuristic graph-search for a path on the image graph that corresponds to an image of the ophthalmic layer by assigning at least one of link-costs to links of the image graph and node-costs to nodes of the image graph; assigning heuristic-costs to at least one of the nodes and the links of the image graph; (a) creating $(N+1)^{st}$ extended paths by extending an $N^{th}$ selected path from its $N^{th}$ front node with $(N+1)^{st}$ extension links; (b) determining path-costs of the $(N+1)^{st}$ extended paths by combining at least one of link-costs and node-costs of the $(N+1)^{st}$ extended paths with heuristic costs of the $(N+1)^{st}$ extended paths, wherein the heuristic cost of a path is the heuristic cost of its front node, the link-cost of the path is a sum of the link-costs of the links of the path and the node-cost of the path is a sum of the node-costs of the nodes of the path; and (c) selecting a smallest cost path, chosen from the $(N+1)^{st}$ extended paths and from stored non-selected paths, as the $(N+1)^{st}$ selected path; and (d) storing $(N+1)^{st}$ non-selected paths and their costs, and marking the Nth front node as examined, wherein the method comprises repeating steps (a)-(d) iteratively.

BRIEF DESCRIPTION OF THE DRAWINGS

FIGS. 3A-D illustrate aspects of the imaging.
FIGS. 4A-C illustrate generating feature image data.

FIGS. 11A, 11B-1, 11B-2 and 11C illustrate the method 100/300 on a specific example.

DETAILED DESCRIPTION

Embodiments are addressing the above challenges by introducing a heuristic cost as a further guiding force for the search of the ophthalmic layer in the image. Such embodiments of the image segmentation method have the following advantages, among others:

(1) The heuristic search can achieve a much-accelerated processing speed, which is critical for real-time image processing during surgical interventions. Especially for the case of layered images, the here-introduced heuristic functions can accelerate the search algorithms substantially to achieve fast image segmentation.

(2) The heuristic search can achieve globally optimized image-recognition results. Correspondingly, speckle noise, blood vessel shadows and pathologies have little distortion effect on the segmentation results.

(3) The heuristic search reduces and even minimizes pre-processing load. Therefore, image filtering, smoothing and enhancement are less critical than in other searches.

(4) The heuristic search is robust over a large dynamic range. Unlike threshold-based segmentation techniques, the heuristic approach doesn't require a specific threshold value and can automatically accommodate images at different intensity ranges.

Figure 1:
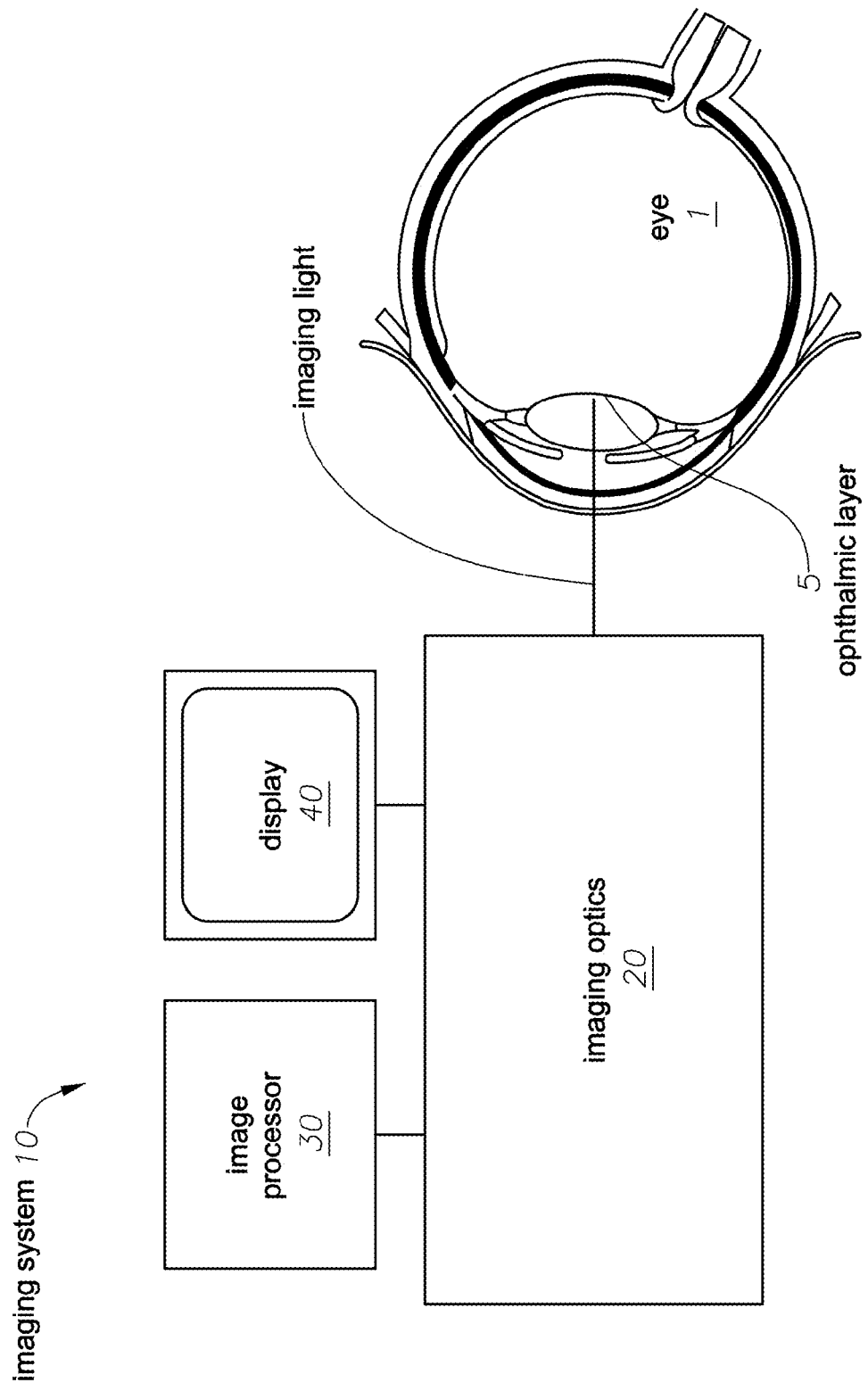
FIG. 1 illustrates an imaging system for practicing embodiments of the method 100.

FIG. 1 illustrates a system to practice embodiments of the heuristic automated segmentation search. As shown, an eye 1 includes several ophthalmic layers 5, examples including the distal surface of the cornea, the proximal and distal lens capsule surfaces, and retinal surfaces. An imaging system 10 that can be used for practicing embodiments of the invention for a fast heuristic graph search to identify an image of any one of these ophthalmic layers 5 can comprise an imaging optics 20, coupled to an image processor 30 and a display 40.

Figure 2A:
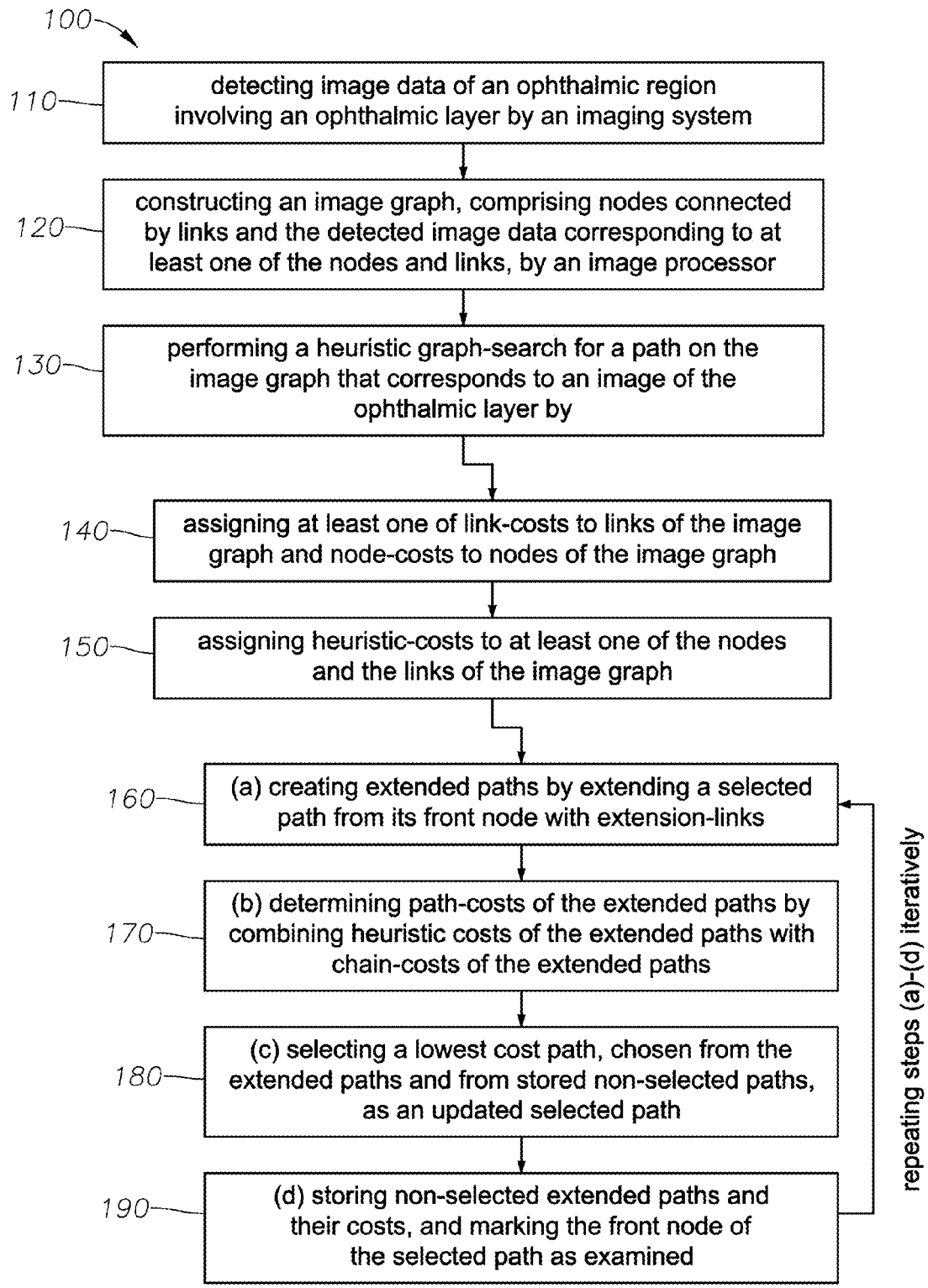
FIGS. 2A-B illustrate embodiments of the method 100.

FIG. 2A illustrates that embodiments of a method 100 to process an ophthalmic image can include:
- 110—detecting image data of an ophthalmic region involving the ophthalmic layer 5 by the imaging system 10;
- 120—constructing an image graph comprising nodes connected by links and detected image data corresponding to at least one of the nodes and links, by an image processor; and
- 130—performing a heuristic graph-search for a path on the image graph that corresponds to an image of the ophthalmic layer by
- 140—assigning at least one of link-costs to links of the image graph and node-costs to nodes of the image graph;
- 150—assigning heuristic-costs to at least one of the nodes and the links of the image graph;
- 160/(*a*)—creating extended paths by extending a selected path from its front node with extension links;
- 170/(*b*)—determining path-costs of the extended paths by combining heuristic costs of the extended paths with chain costs of the extended paths, wherein the heuristic cost of a path is the heuristic cost of its front node, and the chain cost of a path is one of a sum of the link-costs of the links of the path, a sum of the node-costs of the nodes of the path, and a weighted sum of the link-costs and node-costs of the links and nodes of the path;
- 180/(*c*)—selecting a lowest cost path, chosen from the extended paths and from stored non-selected paths, as an updated selected path; and
- 190/(*d*)—storing non-selected extended paths and their costs, and marking the front node of the selected path as examined.

The steps (a)-(d) can be performed repeatedly to identify the selected path that is representative of the ophthalmic layer image.

Figure 2B:
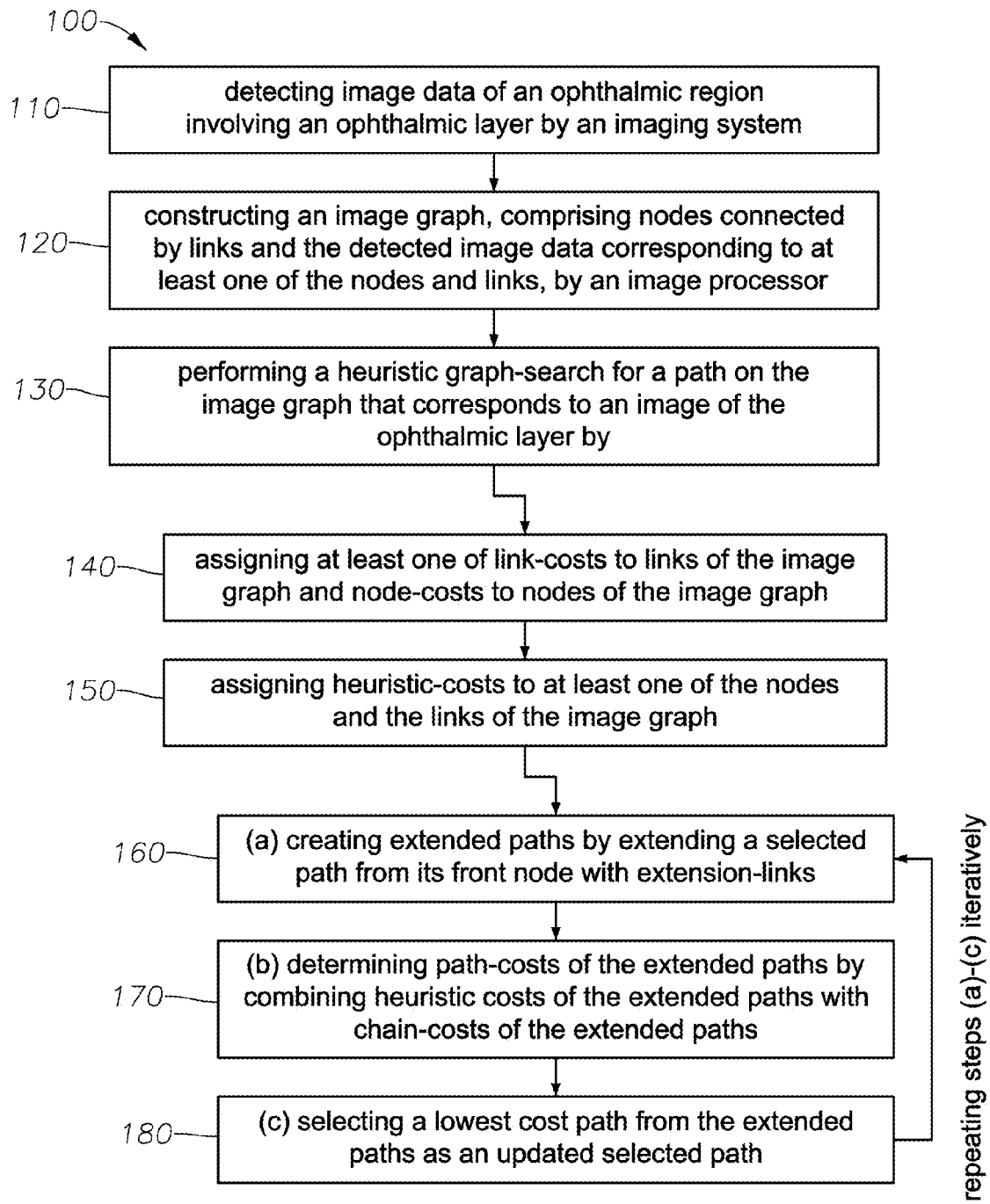

FIG. 2B illustrates that a related embodiment of the method 100 to process an ophthalmic image can include:
- 110—detecting image data of an ophthalmic region involving the ophthalmic layer 5 by the imaging system 10;
- 120—constructing an image graph comprising nodes connected by links and detected image data corresponding to at least one of the nodes and links, by an image processor; and
- 130—performing a heuristic graph-search for a path on the image graph that corresponds to an image of the ophthalmic layer by
- 140—assigning at least one of link-costs to links of the image graph and node-costs to nodes of the image graph;
- 150—assigning heuristic-costs to at least one of the nodes and the links of the image graph;
- 160/(*a*)—creating extended paths by extending a selected path from its front node with extension links;
- 170/(*b*)—determining path-costs of the extended paths by combining heuristic costs of the extended paths with chain costs of the extended paths, wherein the heuristic cost of a path is the heuristic cost of its front node, and the chain cost of a path is one of a sum of the link-costs of the links of the path, a sum of the node-costs of the nodes of the path, and a weighted sum of the link-costs and node-costs of the links and nodes of the path;
- 180/(*c*)—selecting a lowest cost path from the extended paths.

The steps (a)-(c) can be performed repeatedly to identify the selected path that is representative of the ophthalmic layer image.

FIGS. 3A-D illustrate that the taking an image step 110 can include taking an image 200 of the ophthalmic region that includes an ophthalmic layer 201. The ophthalmic layer 201 may refer to an entire layer that separates two ophthalmic regions. An example could be the capsular bag, separating the crystalline lens of the eye from the vitreous of the eye. In such embodiments, the reflection and optical properties of the two separated regions may or may not be different from each other, but the reflection properties of the ophthalmic layer between them are different from those of the two regions. In other embodiments, the ophthalmic layer 201 can be an edge of an ophthalmic region. An example could be the distal surface of the cornea, separating the cornea from the anterior chamber. In some sense, the graph search can be viewed as a specific adaptation of an edge search method for the unique demands of the ophthalmic imaging.

As illustrated in FIG. 3A, a goal of the method 100 is to perform a search for a path 205 that is an approximate image of the ophthalmic layer 201 with a desired precision. As indicated, the search for the path 205 can start from one edge of the image 200 and can be extended step-by-step iteratively to track the ophthalmic layer 201 to the opposite edge of the image 200.

FIG. 3A shows the underlying ophthalmic layer 201 in the image 200. Of course, in actual practice the location of the ophthalmic layer 201 is not known after the image 200 and its corresponding image data are detected. The central challenge of image recognition methods is to determine the unknown actual location of this underlying ophthalmic layer 201 from the raw noisy detected image data that exhibit only an image intensity change across the ophthalmic layer 201, as shown in FIG. 3C and explained below. Since often the detected image data is much less conclusive and noisier than showed in FIG. 3C, sophisticated methods are needed to evolve and determine the path 205 to identify the location of the ophthalmic layer 201. Methods like the here-described method 100.

FIG. 3B, zoomed in to a small region of the image 200 of FIG. 3A, illustrates that the constructing the image graph in step 120 can include receiving detected image data of the ophthalmic region from the imaging optics 20, where the image data can correspond to nodes 210, such as to pixels 210 of the imaging system 10. For definiteness and ease of referencing, an (x,y) coordinate system is introduced that allows the identification of the nodes 210 according to their (x,y) coordinates as node 210(x,y). This (x,y) notation will be used primarily when it helps specifying the spatial relationships between the labeled elements. In numerous embodiments, the imaging system 10 can detect the image data via a regular array of detectors, pixels or sensors. An example can be a rectangular or square array of pixels 210(x,y) in an electronic camera, a video camera, a CCD camera, or a sensor array of an Optical Coherence Tomography (OCT) imaging system.

The nodes 210(x,y) can be connected by links 220 to complete the image graph. In some embodiments, the nodes 210(x,y) can have corresponding physical sensors or pixels, while the links 220(x,y,Δy) that connect nodes 210(x,y) with nodes 210(x,y+Δy), and the links 220(x,y,Δx) that connect nodes 210(x,y) with nodes 210(x+Δx,y) may correspond to the mathematical construction of links of the image graph. The links can have three variables: the (x,y) coordinates, and the third, Δx or Δy variable. Such a triple-variable (x,y,Δx) indicates that the link 220(x,y,Δx) is connecting two nodes whose y coordinates are the same and whose x coordinates differ by the short distance Δx. In a typical implementation, Δx can be a nearest neighbor distance between neighboring nodes. Longer links that connect farther neighbors can be also used. The links will be referred to as link 220, 220(x,y) or 220(x,y,Δx)/220(x,y,Δy), whichever reference is most helpful. In a regular lattice of nodes 210, Δx or Δy can refer to a lattice constant between neighboring nodes. In continuous images, Δx or Δy can refer to a small distance between (x,y) points used to characterize the image 200, in a sense defining the resolution of the image 200.

In some other systems, the links 220(x,y) may have physical embodiments as described below, and the nodes 210(x,y) may be the primarily mathematical constructions. Finally, in some systems both nodes 210(x,y) and links 220(x,y) may have physical embodiments.

In some embodiments, the links 220(x,y,Δx) can connect only nearest neighbor pixels 210(x,y) and 210(x+Δx,y). In other embodiments, additional links 220(x,y,Δx,Δy) can connect diagonally neighboring pixels 210(x,y) and 210(x+Δx, y+Δy), necessitating the introduction of a fourth variable. In yet other embodiments, links 220 can connect pixels even farther away, separated by a distance larger than the lattice constant a or Δx, but not exceeding a cutoff distance.

FIG. 3C illustrates a y-directional cross section of the image graph, shown in FIG. 3B. The image graph itself can be a collection of such cross sections. The horizontal axis can refer to the nodes 210(x,y) or the links 220(x,y) of the y directional cross section of the image graph for a fixed value of x. The vertical axis of the image graph can show detected image data 230(x,y) that correspond to the nodes 210(x,y) or the links 220(x,y) as a function y, for a fixed x. The detected image data 230(x,y) can be an image intensity, a polarization state, a color, a phase, or other data of the imaging light that carries imaging information associated with the nodes 210 (x,y).

A simple example can be a CCD imaging system with an array of pixels or sensors that constitute the nodes of the image graph and the image data being the image intensity, sensed by the individual pixels of the CCD camera.

In the particular case of the imaging system 10 being an OCT imaging system 10, the detected image data 230(x,y) can be related to an intensity of an "interference beam" that was generated by interfering an imaging light returned from the eye 1 with a reference light, returned from a reference arm of the OCT imaging system 10. Such an interference beam carries image information in its amplitude and phase that can translate into an amplitude or intensity of the detected image data 230(x,y).

The image data can also be pre-processed by the image processor 30 that can be part of the OCT imaging system 10. The OCT imaging system 10 can associate a pseudo-color, adjust a contrast, adjust a brightness, filter, normalize, implement a noise-reduction, enhance the image data, and implement a histogram-equalization, among others. Therefore, throughout this application, "detecting the image data" can refer to a raw detection of raw image data, but in other embodiments detecting the image data can be more inclusive and can include some level of pre-processing of the raw image data beyond detection.

FIG. 3D illustrates a further aspect of the constructing an image graph 120: generating of feature image data 240 from the detected image data 230(x,y) by the image processor 30. Here, the feature image data 240 can correspond to an intensity, a phase, a gradient, or a texture of the detected image data 230(x,y). For example, in FIG. 3D the feature image data 240(x,y,Δx) can correspond to a finite, or discrete, gradient of the detected image data 230(x,y), defined as a finite difference of the image data 230(x,y) of the nodes 210(x,y+Δy) and 210(x,y) along the link 220(x,y,Δy):

feature image data 240(x,y,Δy)=$f$(detected image data 230(x,y+Δy)−detected image data 230(x,y)), and analogously in the x direction, for the orthogonal orientation. Here $f(z)$ is a function of its argument z. One of the simplest embodiment is $f(z)=z$, which results in the feature image data 240 being the above-mentioned discrete gradient of the detected image data 230. Several other functions $f(z)$ can be employed as well, that can be increasing or decreasing functions of their argument. The feature image data 240(x,y,Δy) can be assigned to either the corresponding nodes 210(x,y), or to the links 220(x,y,Δy) across which the discrete gradient has been computed.

FIG. 3C illustrates that for the image of the ophthalmic layer 201 that separates two ophthalmic regions with different light-reflecting properties, the detected image data 230($x,y$) can exhibit a shoulder, or drop, as the y coordinate sweeps through the location of the ophthalmic layer 201 for a fixed x coordinate. Here, as discussed above, the ophthalmic layer 201 may refer to an entire thin layer between two regions, or to an edge of a thicker region. In either case, the detected image data can exhibit a drop across the ophthalmic layer 201 because the optical properties of the two regions separated by the ophthalmic layer 201 are different.

FIG. 3D illustrates that in the embodiment that uses the above discrete gradient of the detected image data 230 as the feature image data 240, the feature image data 240 can exhibit a peak at the location of the ophthalmic layer where the detected image data 230 exhibits a shoulder or drop. This example demonstrates that the feature image data 240 is designed to be different from zero only in the vicinity of the ophthalmic layer 201 and as such, can be useful to define search costs that guide the search for the path 205 that best approximates the location of the ophthalmic layer 201.

Figure 4C:
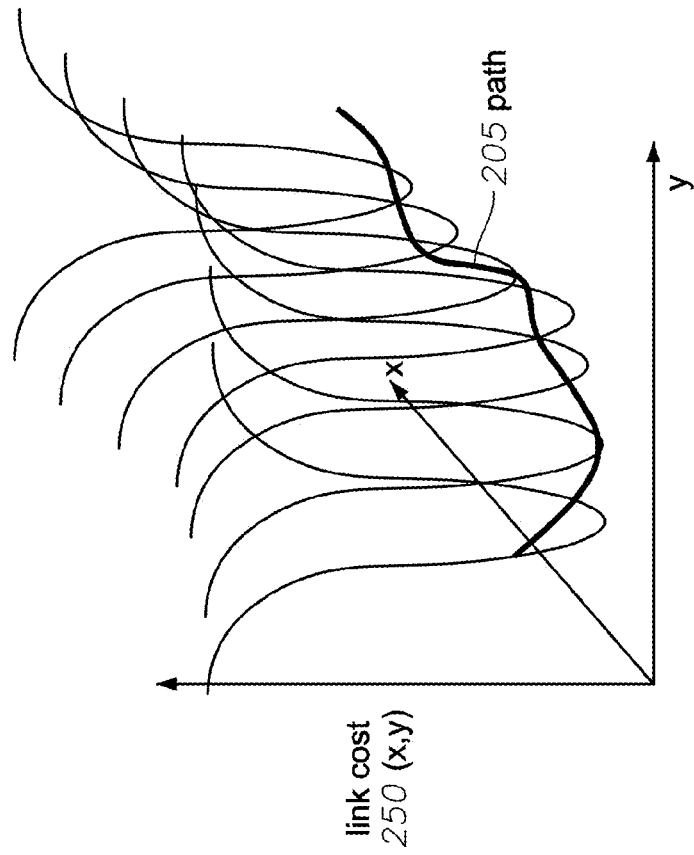
Figure 4B:
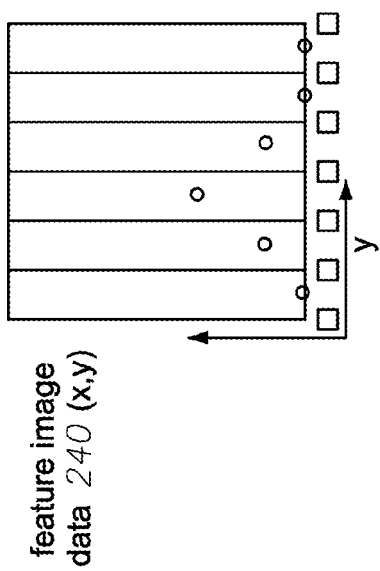
Figure 4B:
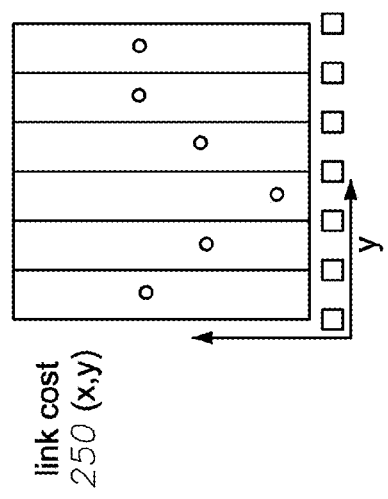

FIGS. 4A-C illustrate that once the image graph is constructed, and the feature image data 240($x,y$) are constructed, the performing the heuristic graph search 130 step can comprise using the feature image data 240 for determining and assigning link-costs to links or node-costs to nodes of the image graph in step 140, and determining and assigning heuristic costs to at least one of the nodes and links of the image graph in step 150.

This performing the heuristic graph search step 130 will be illustrated on an example where the constructing the image graph 120 comprises defining the nodes 210 to correspond to pixels of the imaging system 10, and the links 220 as links connecting the nodes 210. The constructing 120 further includes receiving detected image data 230 of the ophthalmic region from the imaging system 10, and generating feature image data 240 from the detected image data 230 by the image processor 30, as shown in FIG. 4A. In some embodiments, the feature image data 240 can correspond to at least one of a discrete gradient, or a finite difference of intensities, or a phase difference between nearby nodes of the detected image data 230. The nodes 210 connected by the links 220 can be nearest neighbors, diagonal neighbors, or neighbors within a cutoff distance.

Once the construction of the image graph 120 and in particular, the generating of the feature image data 240 has been performed, the performing the heuristic graph search 130 can commence, starting with the steps 140 and 150. These costs will be used to guide the heuristic graph-search that further comprises the steps 160-190.

FIG. 4B illustrates that in some embodiments, the assigning costs 140 step can be based on assigning link costs 250($x,y$) to the links 220($x,y$) in such a way that the link cost 250 of the link decreases when the feature image data 240 of the same link increases. An example can be to subtract the feature image data 240, defined as a finite gradient in FIG. 4A, from a suitable maximum. As shown in FIG. 4B, this subtraction produces a link cost 250 that shows a minimum where the feature image data 240 shows a maximum: at the location of the ophthalmic layer 201.

FIG. 4C shows in an approximate and qualitative sense how the just-defined link costs 250 that exhibit a minimum at the location of the ophthalmic layer 201 can guide the graph search. In FIG. 4C, a set of link costs 250 that were each computed as a function of y for a fixed x in FIG. 4B, are assembled for a range of x values, to form a cost-surface over the (x,y) plane of the pixel array. Visibly, the link-cost minima corresponding to individual x values combine into a valley. By construction, the location of this valley tracks the location of the ophthalmic layer 201. A graph search that evolves the path 205 guided by keeping the link cost as low as possible will force the path to evolve along the bottom of the valley, thus tracking the ophthalmic layer 201.

Figure 5C:
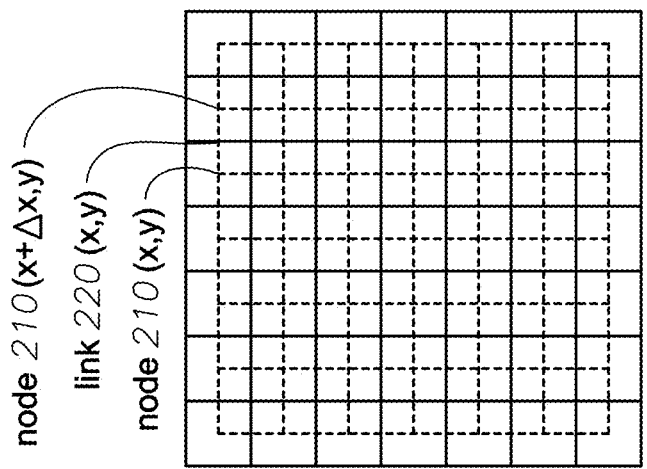
FIGS. 5A-C illustrate different image graphs.
Figure 5B:
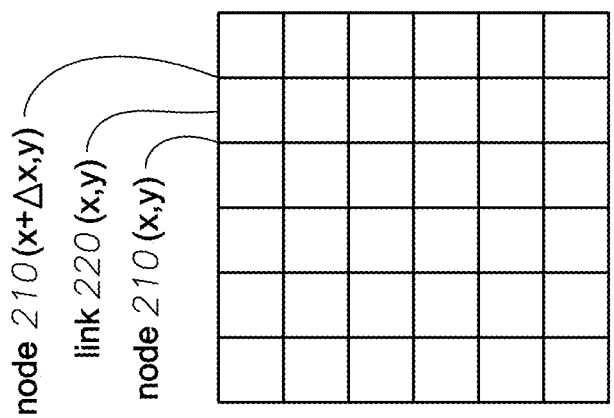
Figure 5A:
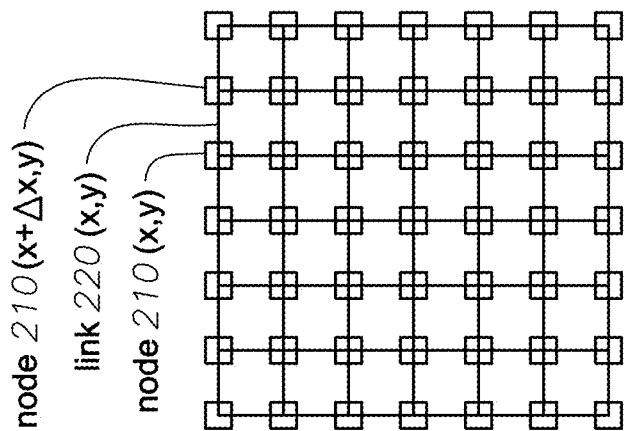

Before proceeding to translate this qualitative picture of FIGS. 4A-C into a quantitative and fast method, FIGS. 5A-C demonstrate different definitions of nodes and links in different embodiments. In FIG. 5A, the nodes 210 include imaging elements such as pixels of the imaging system 10. In some embodiments, the links 220 need not have physical realizations, they can be mathematical objects, completing the definition of the image graph. FIG. 5B illustrates an embodiment, where the elements at the nodes have minimal spatial extent. Here the nodes 210 are so small that they are essentially the vertices of the lattice of links. The nodes are the intersections or connecting points of the links 220. Finally, FIG. 5C illustrates an embodiment with the opposite character: the elements at the nodes 210 can be also quite large. For example, the elements can be pixels with size essentially the same as the size of the links 220. In such embodiments, the pixels and thus the nodes 210 essentially touch each other. An abstract notion of the links 220 can still be based on the dotted lines underlying the square pixels. Physical manifestations of the links 220 can be the edges where neighboring pixels touch. In some sense, the graphs of FIG. 5B and FIG. 5C are dual to each other, links and nodes appearing to exchange graphical representation. These embodiments are limiting cases to the embodiment of FIG. 5A with intermediate size pixels serving as the nodes 210. In this document, the "nodes and links" terminology can refer to any one of the embodiments of FIG. 5A, 5B or 5C, as well as equivalent realizations.

Figure 6A:
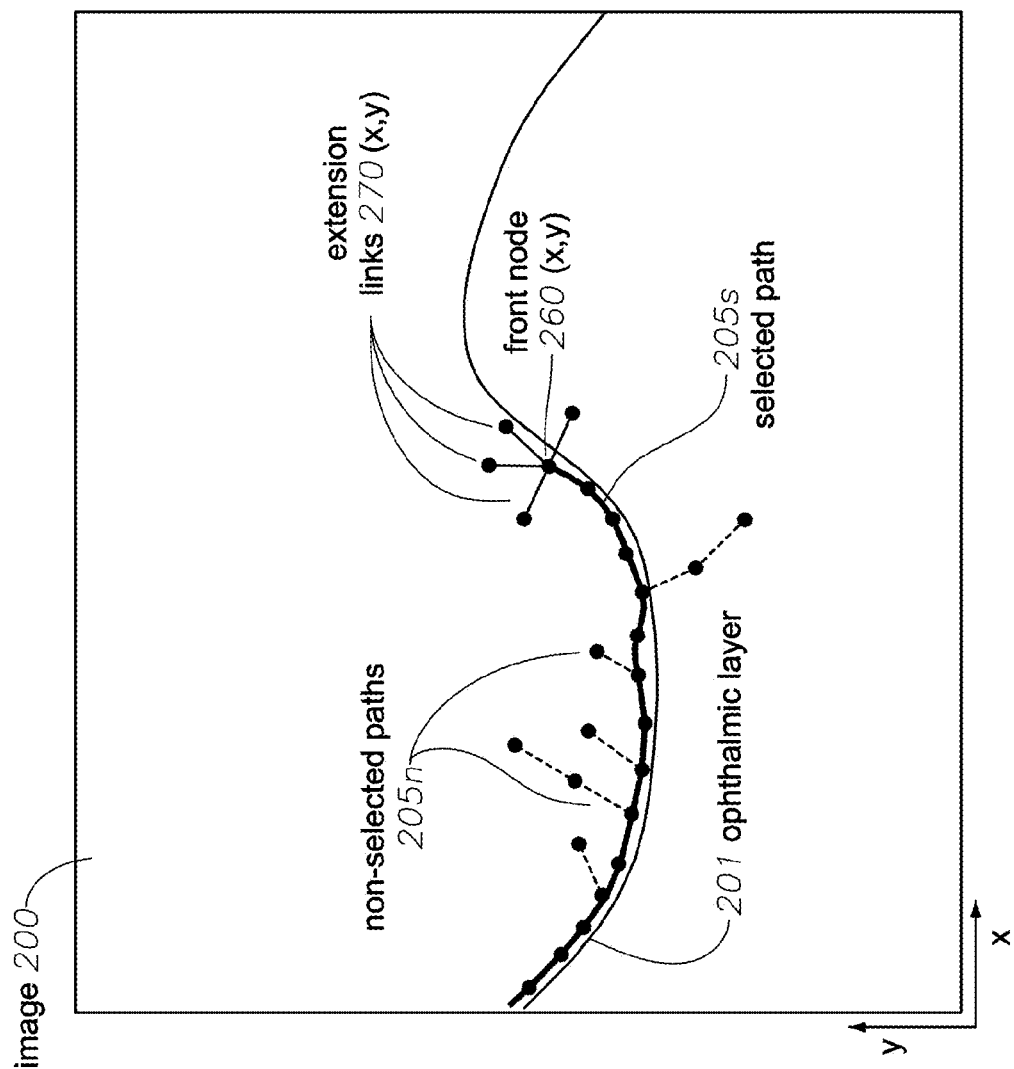
FIGS. 6A-B illustrate aspects of the method 100.
Figure 6B:
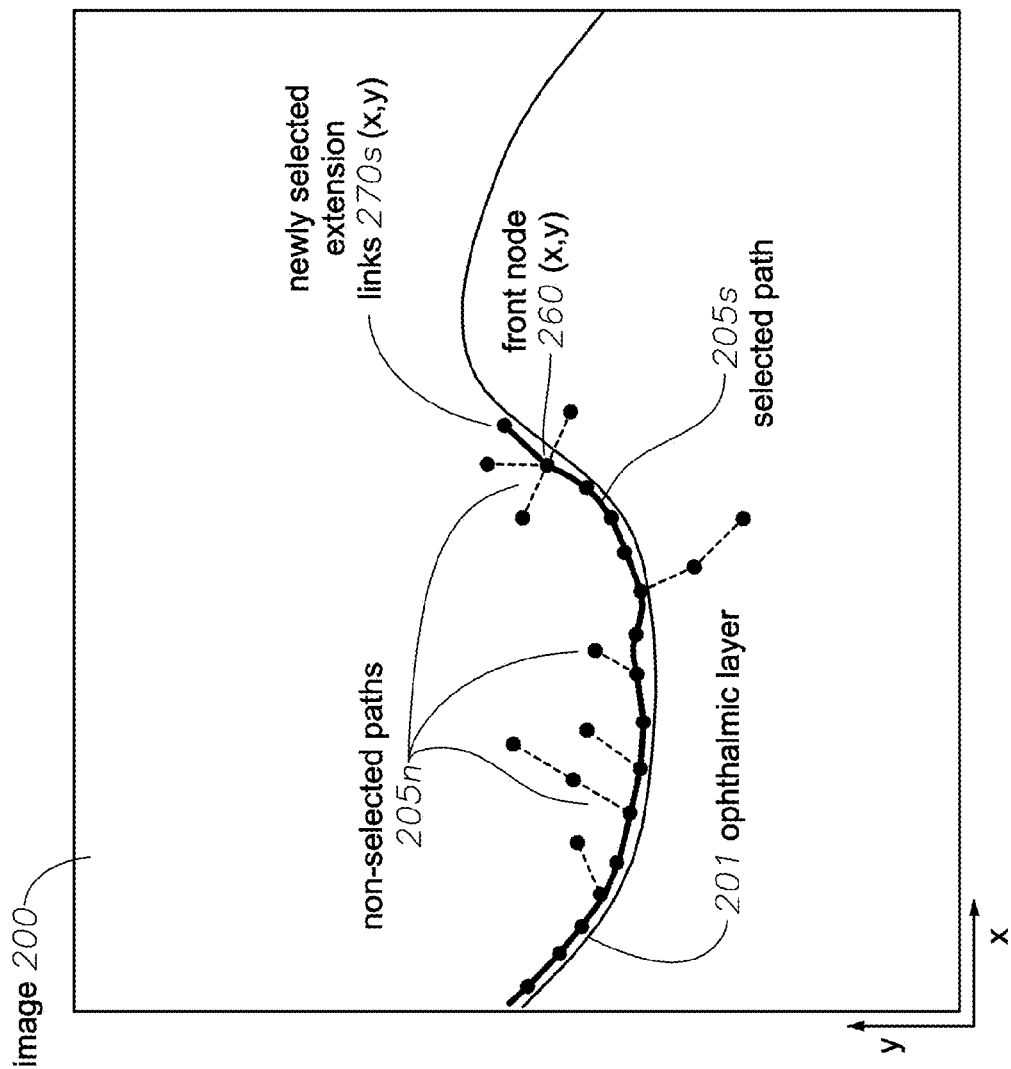

FIGS. 6A-B illustrate an embodiment of the method 100. It shows the image 200 that includes a shoulder in the image intensity, and a corresponding valley in the feature image data, that both track the location of the ophthalmic layer 201 in the image 200. FIG. 6A shows elements of the method 100 after the path 205 has been updated in a number of iterations. The resulting path 205, or selected path 205$s$, is indicated by the solid bold line. Here, only the relevant nodes and links of the imaging system 10 are shown for clarity.

As explained above, the method 100 starts with the detecting step 110, taking an image 200 of an ophthalmic region involving the ophthalmic layer 201 by the imaging system 10. Next is the constructing step 120, constructing an image graph of nodes 210($x,y$) connected by links 220($x,y$) and the detected image data 230($x,y$) that corresponds to the nodes 210($x,y$) or links 220($x,y$). A y directional cross section of such image graphs was one shown in FIG. 3C, and developed into an (x,y)-based feature image data 240($x,y$), as shown in FIG. 4C.

The performing step 130 of performing a heuristic graph-search for the path 205 can include the assigning link/node costs step 140, assigning link-costs to the links 220($x,y$) of the image graph or node-costs to the nodes 210($x,y$) of the image graph, and assigning heuristic costs step 150, assigning heuristic-costs to at least one of the nodes and the links. The assigning heuristic costs step 150 will be described in substantial detail in relation to FIG. 9 and FIGS. 10A-D. For the description of FIGS. 6A-B and FIGS. 8A-D, it is understood that the heuristic costs of the paths have been properly calculated and assigned.

FIG. 6A illustrates that after assigning the link costs or the node costs, as well as the heuristic costs, the creating step 160/($a$) can include creating extended paths by extending a selected path 205$s$ from its front node 260($x,y$) with extension links 270($x,y$). The selected path 205$s$ itself is the path 205 that resulted from performing the selecting step 180/(c) repeatedly and iteratively in a sequence of previous updates. The treatment of the non-selected paths 205n will be described later.

The next, determining step 170/(b) can include determining the path-costs of the extended paths by combining heuristic costs of the extended paths and chain-costs of the extended paths. Here, it is recalled that the heuristic cost of a path can be defined as the heuristic cost of its front node, and the chain-cost of a path can be defined as one of a sum of the link-costs of the links that make up the path, a sum of the node-costs of the nodes that make up the path, and a weighted sum of the link-costs and the node-costs of the links and nodes of the path.

In some embodiments, the determining step 170/(b) can be an incremental approach that does not recalculate the full path-costs of the extended paths in every iteration. Instead, the embodiment can calculate only the updates, or changes, of the path-costs, triggered by extending the selected path 205s with extension links 270. In such an incremental approach, the determining step 170/(b) can include calculating the changes of the heuristic-cost of the selected path 205s and the changes of the chain-cost of the selected path 205s, both caused by provisionally extending the selected path 205s with the various possible extension links 270; and determining the costs of the provisionally extended paths by updating the cost of the selected path 205s with a combination of the changes of the heuristic cost and the changes of the chain-cost. The combination can be a simple addition of the two changes, a weighted summation, or can involve a functional calculation.

In other embodiments, the determining step 170/(b) can involve a comprehensive computation of the costs. In such embodiments, the chain-costs and the heuristic costs of the selected paths 205s, provisionally extended by various possible extension links 270, are calculated anew, without reference to the costs calculated in previous steps, or without calculating an increment.

The next, selecting step 180/(c) can include selecting a lowest cost path, by choosing the lowest cost path from the newly extended paths and from the stored non-selected paths 205n, as an updated selected path 205s.

FIG. 6B illustrates that the result of the selecting step 180/(c) can be an updated selected path 205s by extending the previous selected path from its front node 260$(x,y)$ with the newly selected extension link 270$s(x,y)$. In some cases, the lowest cost path will be the previous selected path 205s, extended by one of the provisionally proposed extension links 270$s(x,y)$. In other cases, e.g. when the selected path is encountering a high cost region, the lowest cost path can be instead one of the stored, previously non-selected path 205n. This non-selected paths 205n were not selected in previous steps because their costs may have been higher than that of the eventually selected paths, but if in the present step the selected path can only be extended with higher cost extension links, then the cost of one of the previously non-elected paths 205n may turn out to be the lowest cost path. In such cases, the non-selected stored path 205n with the lowest cost will be selected in the selecting step 180/(c). In some sense, selecting a previously non-selected path 205n can be viewed as the graph search method 100 retracing its steps once it encounters a high-energy obstacle.

The method 100 can also include storing step 190/(d): storing the non-selected paths 205n and their costs, not selected in the just-executed selecting step 180/(c). The costs of these non-selected paths 205n will be recalled in the subsequent selecting steps 180/(c) during the subsequent iterations of the method 100. Once the costs of the non-selected paths 205n are recalled in a subsequent selecting step 180/(c), the selecting of the lowest cost path can be performed by choosing the lowest cost path selected from the selected path 205s provisionally extended from its front node 260 with the various extension links 270, and from the recalled stored non-selected paths 205n. The selected lowest cost path can then be identified as the updated selected path 205s. The repeating of the steps (a)-(d), or 160-190, can form the repeating iterative block of the method 100 that extends the selected path 205s across the image 200.

In the described embodiments, only extension links 270 that extend the selected path 205s from its front node 260 are provisionally proposed anew. However, the selection of the lowest cost path compares the costs of these provisionally extended paths with the costs of all the stored, previously non-selected paths 205n as well. In the selecting steps 180/(c), a stored, previously non-selected path 205n can get selected that may differ from the previously selected path 205s in several links. This aspect allows the method 100 to redirect the search for the optimal path into new directions, if the selected path 205s evolves into an unfavorable area, or hits an obstacle. Such obstacles can be a bubble, a high-noise region, an imaging artifact, or a layer-fold, among others.

In the language of FIG. 4C, the lowest cost valley may have splits or forks, where the valley splits into two. As the search method 100 is performed, one of these valleys gets selected and the selected path 205s in that valley is developed or advanced further. However, in a later step, this selected path 205s may encounter a high cost region. In such cases, the selecting step 180/(c) also comparing the extension costs of the selected path 205s to the costs of previously non-selected stored paths 205n makes it possible for the method 100 to retrace its steps back to the last fork and select the other valley for further exploration. In some cases, the previously non-selected path 205n may not even be a fork in the valley, but instead a "mountain-pass" on the side of the valley, protected only by a low cost.

For completeness, in some embodiments of the method 100, extension links 270 can be also provisionally proposed that extend from some of the side nodes from the selected path 205s, not only from its front node 260. Such methods take more time as the number of proposed extension links can be considerably larger. Their more time-consuming performance may be balanced by their utility to explore more opportunities to evolve the selected path 205s. In some of these embodiments a compromise may be struck, where only a limited number of nodes are extended provisionally with extension links.

To recap, some embodiments of the method 100, shown in FIG. 2A, can include repeating steps (a)-(d) iteratively. Other embodiments, shown in FIG. 2B, may not include storing the non-selected paths 205n and their costs, and can propose extensions only starting from the front node 260 of the selected path 205s. Such embodiments repeat only the steps (a)-(c) in FIG. 2B.

Either of these embodiments can extend the selected path 205s until an end-criterion is reached, and identify the extended selected path 205s reached by the method 100 as corresponding to the image of the ophthalmic layer 201. The end-criterion can be that the selected path 205s reaches an edge of the image 200. The image can be displayed, for example, on a display 40.

Step 190/(d) can further include marking the front node 260 of the selected path 205s (front node 260 before the selected path 205s was extended by an extension link 270), as "examined". In future iterations such nodes marked "examined" are not examined anew. This aspect can reduce or eliminate returning to previously analyzed paths, thus making the method 100 progress with the extensions more efficiently.

Figure 7A:
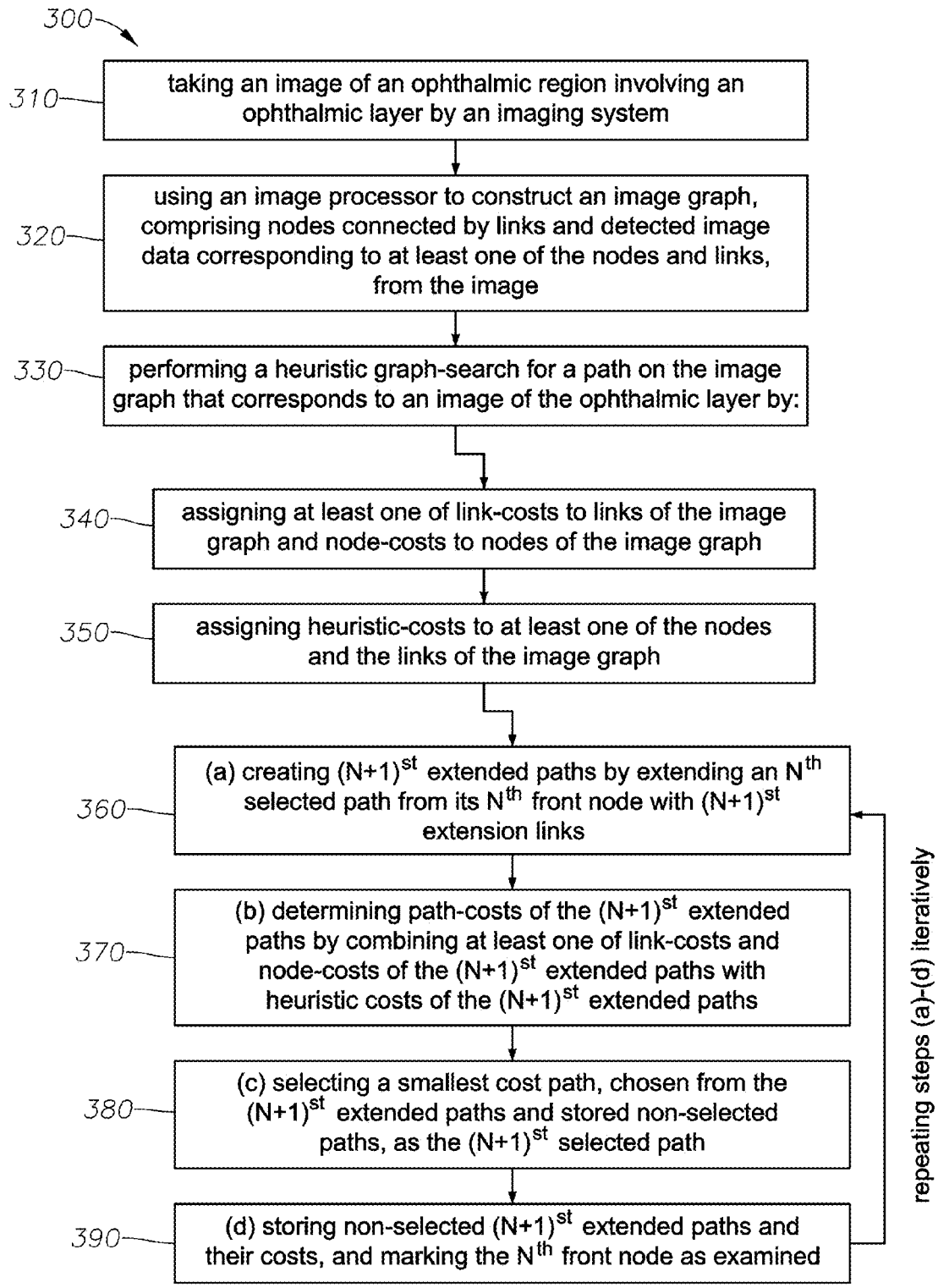
FIGS. 7A-B illustrate embodiments of the method 300, related to the method 100.
Figure 7B:
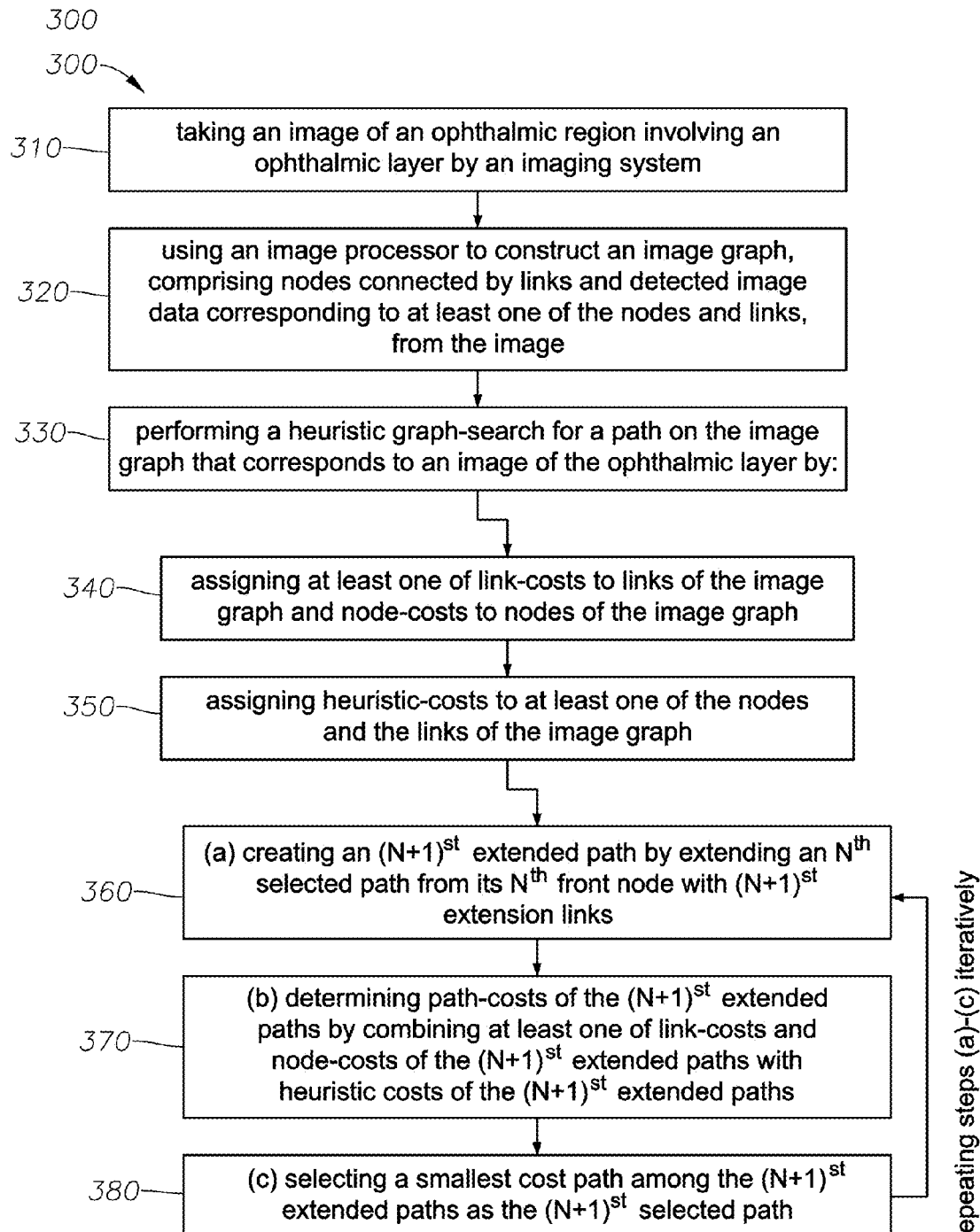

FIGS. 7A-B illustrate a method 300 that is an embodiment of the method 100, formulated in a manner that articulates the repeating of the iterative block or cycle of steps (a)-(c) or (a)-(d) with expressly showing the index, label, or number of the iteration. FIG. 7A illustrates that an embodiment of the method of processing an ophthalmic image 300 can include:

- 310—taking an image 200 of an ophthalmic region involving an ophthalmic layer by an imaging system 10;
- 320—using the image processor 30 to construct an image graph, comprising nodes 210 connected by links 220 and detected image data corresponding to at least one of the nodes and links, from the image 200; and
- 330—performing a heuristic graph-search for a path on the image graph that corresponds to an image of the ophthalmic layer 201 by
- 340—assigning at least one of link-costs to links 220 of the image graph and node-costs to nodes 210 of the image graph;
- 350—assigning heuristic-costs to at least one of the nodes and the links of the image graph;
- 360/(a)—creating $(N+1)^{st}$ extended paths by extending an $N^{th}$ selected path from its $N^{th}$ front node with $(N+1)^{st}$ extension links;
- 370/(b)—determining path-costs of the $(N+1)^{st}$ extended paths by combining at least one of link-costs and node-costs of the $(N+1)^{st}$ extended paths with heuristic costs of the $(N+1)^{st}$ extended paths, wherein the heuristic cost of a path is the heuristic cost of its front node, the link-cost of the path is a sum of the link-costs of the links of the path and the node-cost of the path is a sum of the node-costs of the nodes of the path;
- 380/(c)—selecting a smallest cost path, chosen from the $(N+1)^{st}$ extended paths and from stored non-selected paths, as the $(N+1)^{st}$ selected path; and
- 390/(d)—storing $(N+1)^{st}$ non-selected paths and their costs, and marking the $N^{th}$ front node as examined, wherein the method comprises repeating steps (a)-(d) iteratively.

FIG. 7B illustrates that an embodiment of the method of processing an ophthalmic image 300 can include the above steps 310-380/(c), but not the storing step 390/(d). This embodiment also modifies the step 380/(c) as that step does not include the stored paths in the selecting step 380/(c). In analogy to FIG. 2B, this embodiment only grows the selected path 205s from its front node 260 by extension links 270.

FIGS. 8A-D illustrate the method 300, after steps 310-350 have been performed, or, analogously, after steps 110-150 of the method 100 have been performed.

Figure 8A:
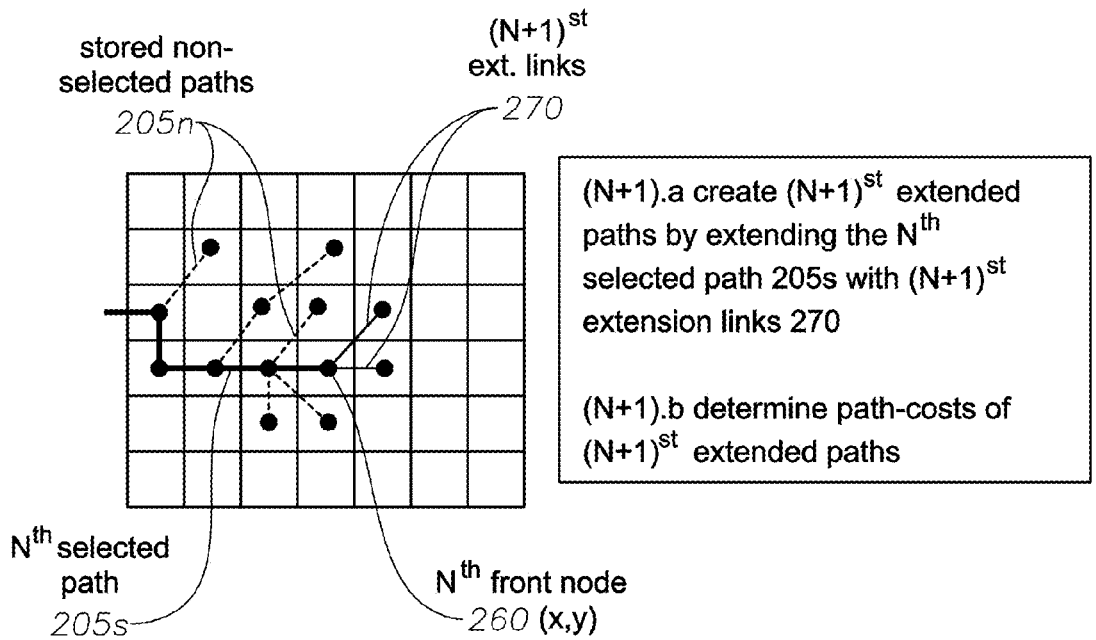
FIGS. 8A-D illustrate an embodiment of the method 300.

FIG. 8A illustrates that N iterations of the method 100/300 evolved the selected path 205s into the $N^{th}$ selected path 205s, ending in an $N^{th}$ front node 260. The creating step 160/360/(a) can include creating $(N+1)^{st}$ extended paths by (provisionally) extending the $N^{th}$ selected path 205s from its $N^{th}$ front node 260 with $(N+1)^{st}$ extension links 270.

Next, the determining step 170/370/(b) can include determining the path-costs of the $(N+1)^{st}$ extended paths.

Figure 8B:
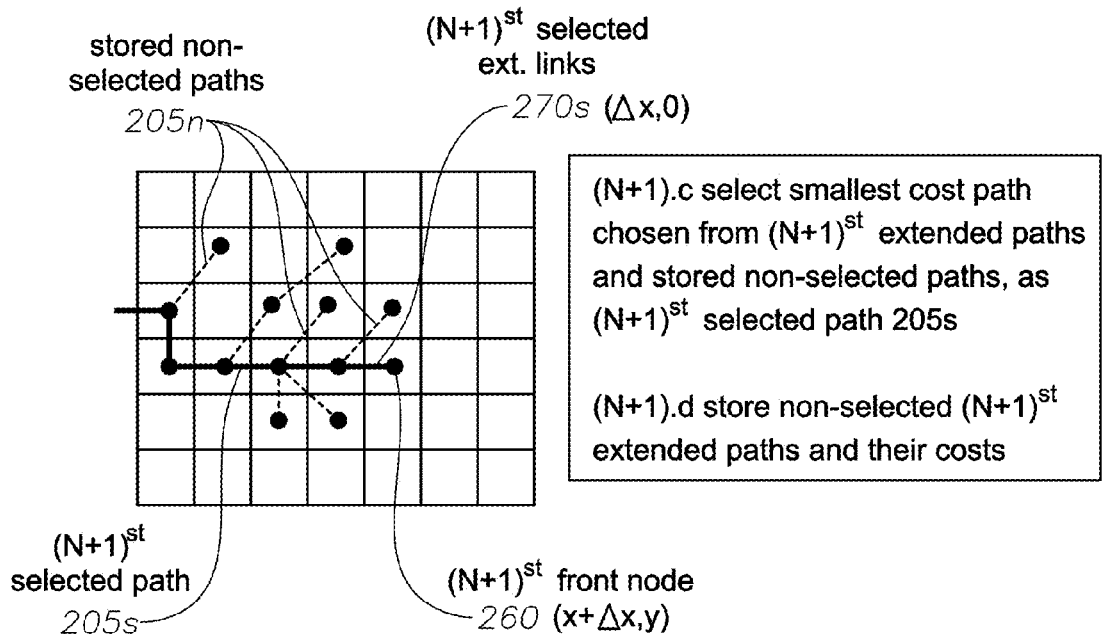

FIG. 8B illustrates that the selecting step 180/380/(c) can include selecting the smallest cost path chosen from the $(N+1)^{st}$ extended paths and from the stored non-selected paths 205n, as the $(N+1)^{st}$ selected path 205s. In FIG. 8B, the selecting step 180/380/(c) selected the $(N+1)^{st}$ selected path 205s as the $N^{th}$ selected path 205s extended by the selected extension link $270s(\Delta x,0)$ from its $N^{th}$ front node $260(x,y)$ in the x direction by a $\Delta x$ distance.

In the storing step 190/390/(d) the $(N+1)^{st}$ non-selected paths and their costs can be stored. Furthermore, the $N^{th}$ front node $260(x,y)$ of the $N^{th}$ selected path 205s can be marked as "examined". Nodes marked as "examined" may not be examined in future iterations.

Figure 8C:
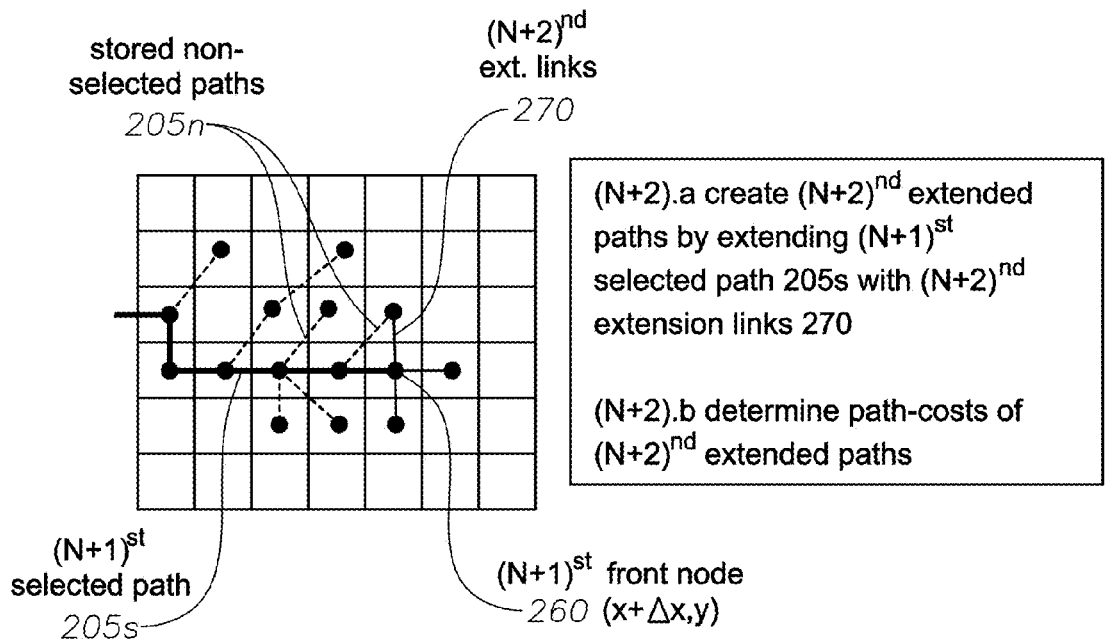
Figure 8D:
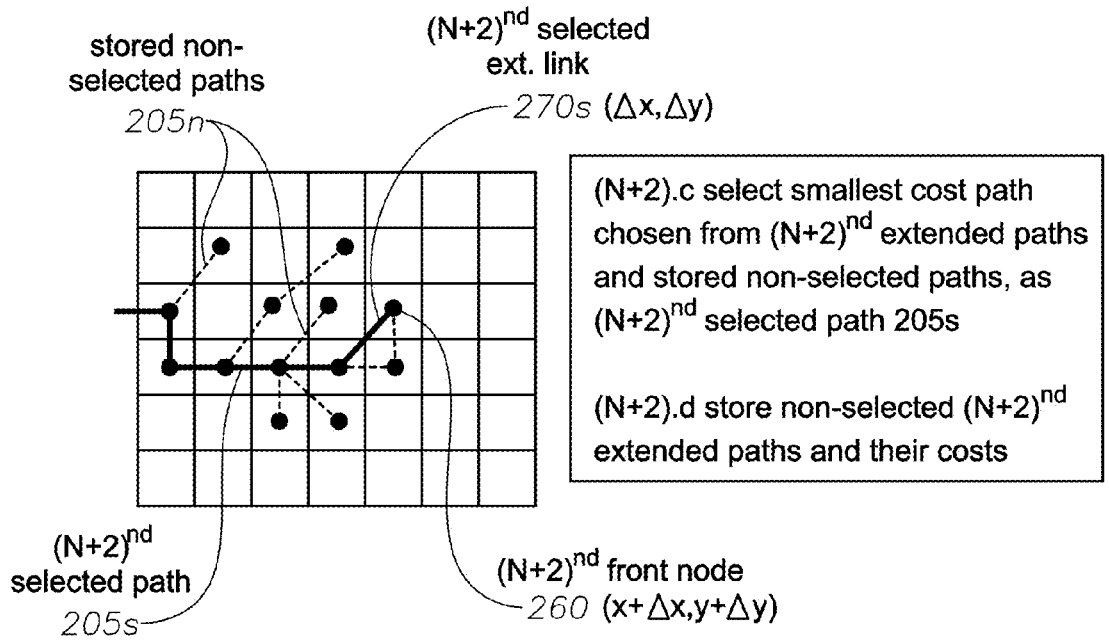

FIGS. 8C-D illustrate that the selecting step 180/380/(c) can also result in selecting a previously non-selected path 205n, for example, in the $(N+2)^{nd}$ step. After the steps (a)-(d) of the $(N+1)^{st}$ iteration, shown in FIGS. 8A-B, have been performed, the $(N+1)^{st}$ selected path 205s ended at the $(N+1)^{st}$ front node 260 with coordinates $(x+\Delta x,y)$. With this, a new, $(N+2)^{nd}$ iteration of the method 100/300 commences. Repeating the creating step 160/360/(a) involves creating the $(N+2)^{nd}$ extended paths by extending the $(N+1)^{st}$ selected path 205s with $(N+2)^{nd}$ extension links 270. This is followed by repeating the determining step 170/370/(b), determining the path-costs of the $(N+2)^{nd}$ extended paths.

Once the path-costs have been determined in the determining step 170/370/(b), the subsequent selecting step 180/380/(c) involves selecting the smallest cost path from the $(N+2)^{nd}$ extended paths and the stored non-selected paths, to select the $(N+2)^{nd}$ selected path 205s. FIG. 8D illustrates the case when the smallest path-cost among the examined paths belongs to previously non-selected path that consists of the $N^{th}$ selected path, extended from its front note $260(x,y)$ (see FIG. 8A) with the $(N+2)^{nd}$ extension link $270(\Delta x,\Delta y)$ diagonally. FIG. 8D illustrates this case, when the path-cost of this previously non-selected, but now recalled path 205n that ends with the diagonal extension link $270(\Delta x,\Delta y)$ has a lower path-cost than any one of the newly extended paths, and is therefore selected as the $(N+2)^{nd}$ selected path 205s.

Through this example, the $(N+2)^{nd}$ performing of steps (a)-(d), shown in FIGS. 8C-D, demonstrates that the method 100/300 may evolve the path 205 not always by extending it from the front node of the path 260 that was selected in the previous step. Instead, the method 100/300 can sometimes retrace some of its steps, and evolve or expand the path 205 not from the front node 260, but by selecting one of the paths 205n that was not selected in a previous step.

Figure 9:
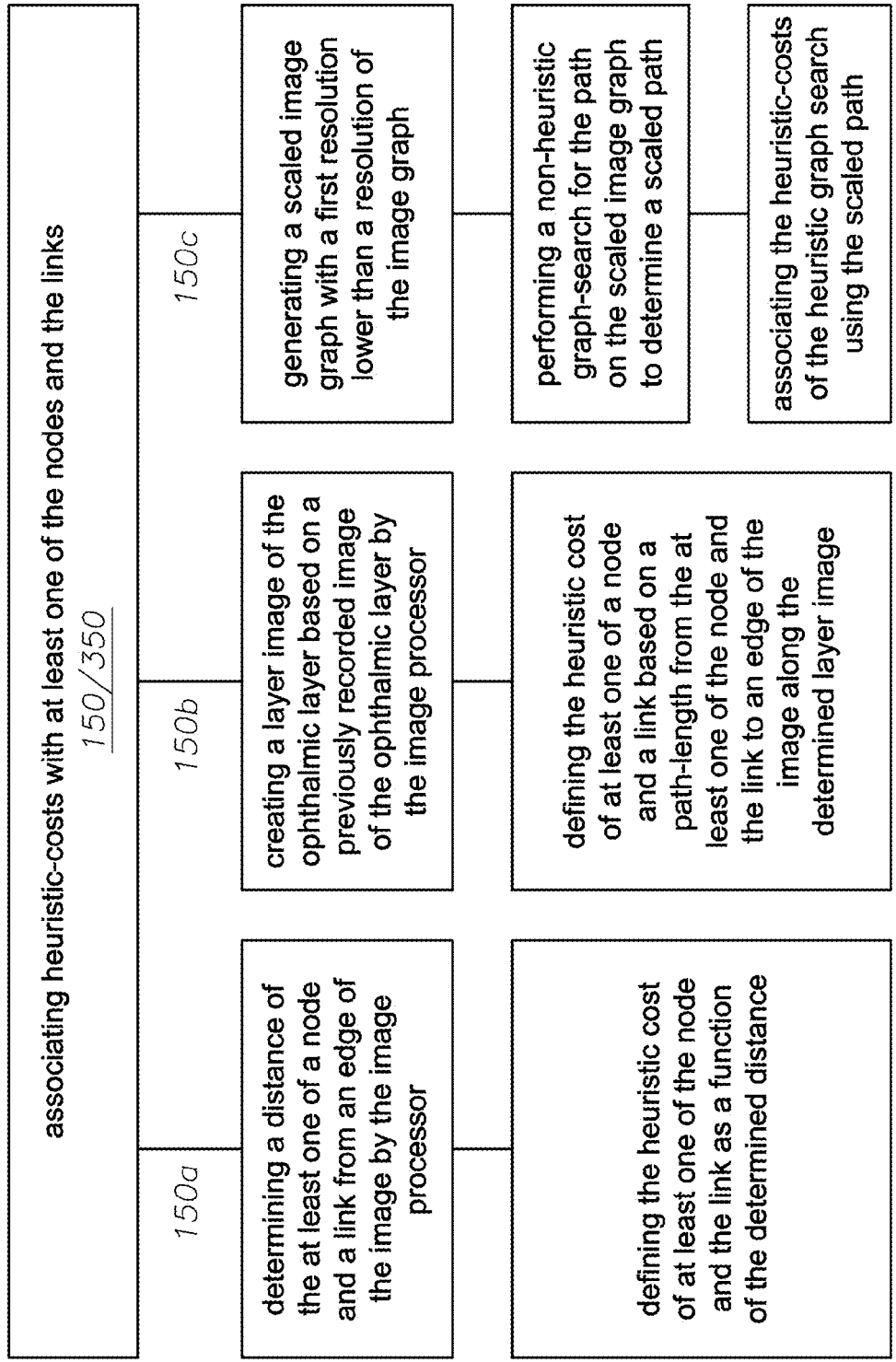
FIG. 9 illustrates embodiments of the assigning heuristic costs step 150/350 of embodiments.

FIG. 9 illustrates various embodiments of the assigning a heuristic cost step 150 or 350. In embodiment 150a, the assigning step can include determining a distance of the node 210 or link 220 from an edge of the image 200 by the image processor 30, and defining the heuristic cost of the node 210 or link 220 as a function of the determined distance. In some cases, the heuristic cost can be simply proportional to the distance from the edge.

Figure 10A:
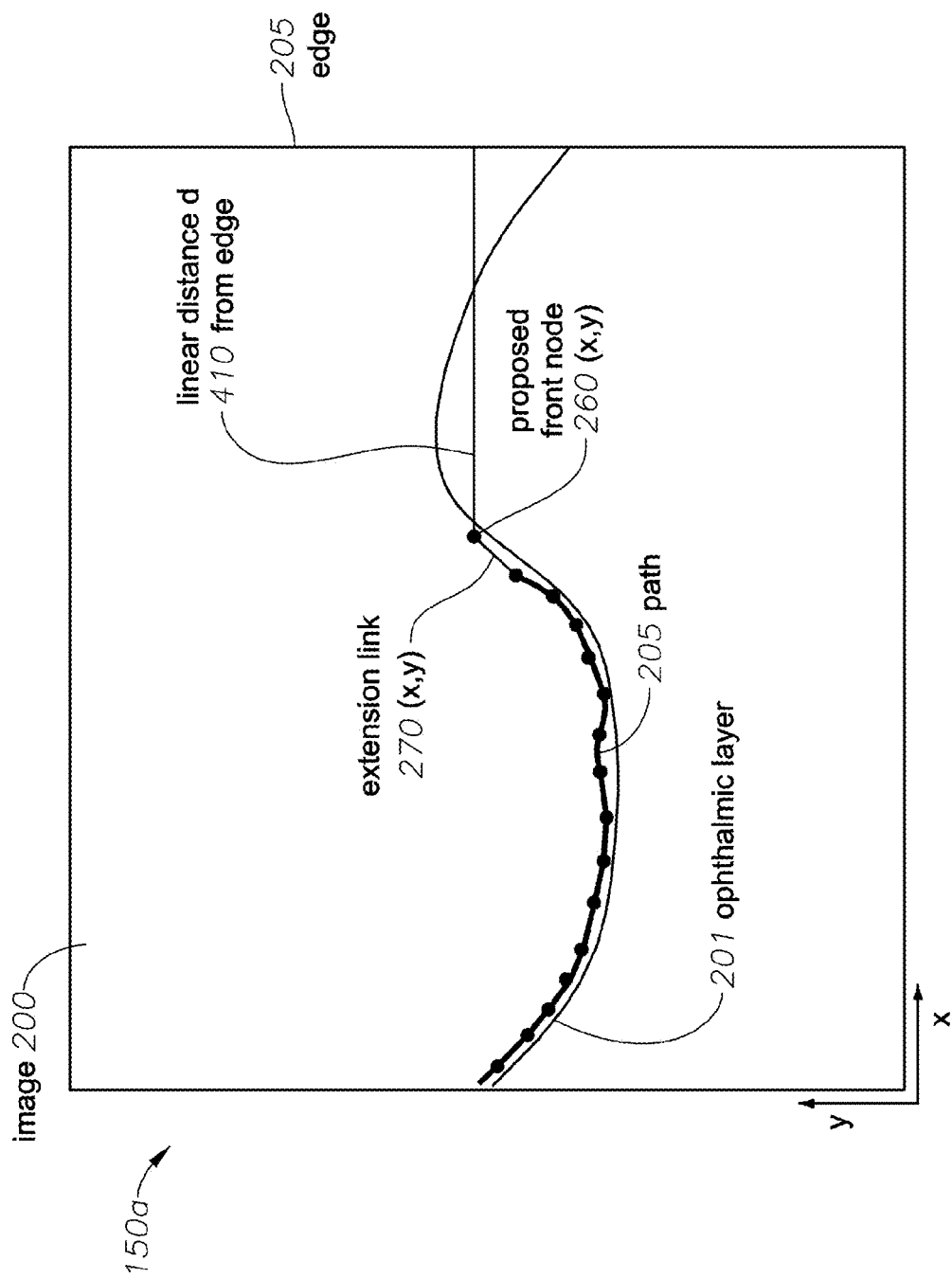
FIGS. 10A-D illustrate embodiments of the assigning heuristic costs step of embodiments.

FIG. 10A illustrates this embodiment 150a. The cost of extending the selected path 205s with the extension link 270 can include adding the link-cost of the extension link 270 and a heuristic cost of the newly proposed front node 260. The heuristic cost can be derived from the distance 410, or d, of the newly proposed front node 260 from an edge 205 of the image 200. In an embodiment, the heuristic cost can be calculated from the corresponding lengths, measured in units of the lattice spacing of the lattice of nodes 210, such as a or $\Delta x$. In some embodiments, this way of computing the heuristic cost is implemented by measuring the distance 410 of the front node 260 from the edge 205 as the number of image pixels.

In the shown case the length of the diagonal extension link is square root 2 in $\Delta x$, or a, the unit of the lattice spacing of the square lattice, while the length of the distance to the edge 410 is the distance d in the same units of $\Delta x$: $N_d = d/\Delta x$. In general, the cost can be any function $f_{cost}$ of the distance: $f_{cost}^{total} = f_{cost}^{link}(\sqrt{2}) + \alpha f_{cost}^{heuristic}(N_d)$. In some embodiments, $f(x)$ can be a monotonous function. In some embodiments, it can be simply the length itself: $f(x)=x$. Further, in various embodiments, the link-cost function and the heuristic cost function can be combined in different manners. For example, the heuristic costs can be added to the link costs with a weight factor $\alpha$. Here, different values of $\alpha$ can impact the speed of convergence of the search method. In some embodiments, $\alpha$ can be 1, simply adding the chain-length of the path to the distance from the edge 205. Obviously, a small $\alpha<1$ characterizes embodiments that give limited weight to the heuristic cost, while a large $\alpha>1$ means that the heuristic cost is given substantial weight in the search algorithm.

Returning to FIG. 9, another embodiment 150*b* of the assigning step 150 can include determining a layer image of the ophthalmic layer based on a previously recorded image of the ophthalmic layer by the image processor, and defining the heuristic cost of a node or a link based on a path-length from at least one of the node and the link to an edge of the image along the layer image.

Figure 10B:
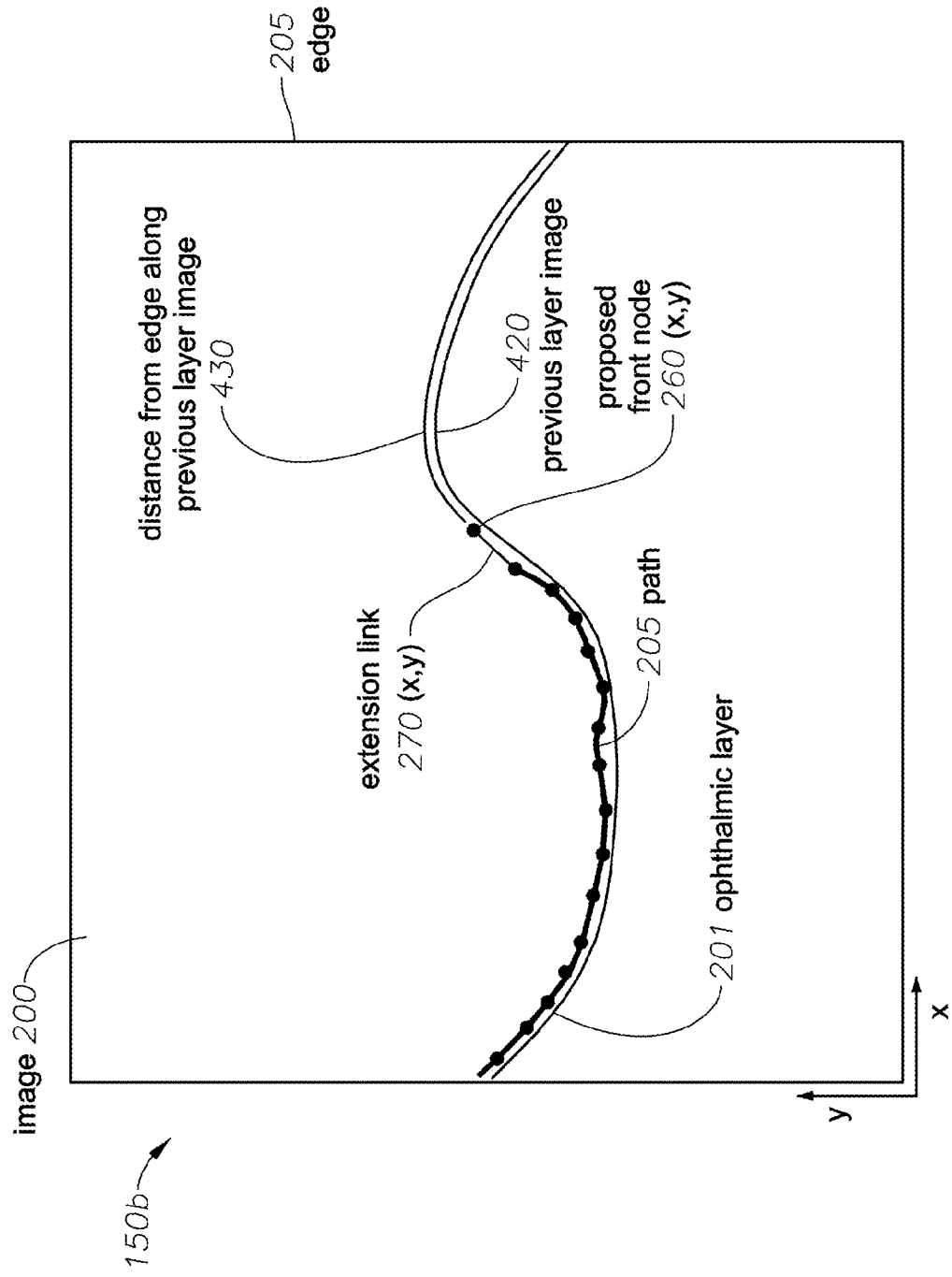

FIG. 10B illustrates an embodiment of 150*b*. In the illustrated embodiment of 150*b*, a previously generated layer image 420 can be used to create a layer image of the ophthalmic layer 201 by the image processor 30. The heuristic cost function can be generated as a distance 430 of the considered extension link 270 or proposed front node 260 from the edge 205 of the image 200, but not along a straight line as in embodiment 150*a*, but along the previously generated layer image 420. As in other embodiments, the heuristic cost can be a function $f_{cost}(d)$ of the distance d 430, and can be added to the link cost or node cost with a weight factor $\alpha$, or combined in another manner.

In some embodiments of 150*b*, in order to make a connection between the presently searched path 205 and the previously recorded layer image 420 that enables the measuring of the distance 430 along the previously recorded layer image, the creating of the layer image step can include registering the previously recorded layer image 420 to the presently searched ophthalmic image 200. In some embodiments, the previously recorded image can be of the same type or the same modality as the presently analyzed ophthalmic image 200. In some cases, both images can be OCT images, or both can be ultrasound images. However, the two images might not be aligned well with each other, as the optical axis of the eye are typically oriented differently when the previous layer image was recorded and when the present ophthalmic image 200 was taken. Also, the previous and the present image can be laterally translated, rotated or scaled relative to each other. Registering the previously recorded image with the ophthalmic layer image 200 can reduce or correct these differences and thus improve the accuracy of the calculation of the heuristic cost.

FIG. 9 illustrates that some embodiments 150*c* of the assigning step 150 can include generating a scaled image graph with a first resolution lower than a resolution of the image graph, performing a non-heuristic graph-search for the path on the scaled image graph to determine a scaled path, and assigning the heuristic-costs of the heuristic graph search using the scaled path.

Figure 10C:
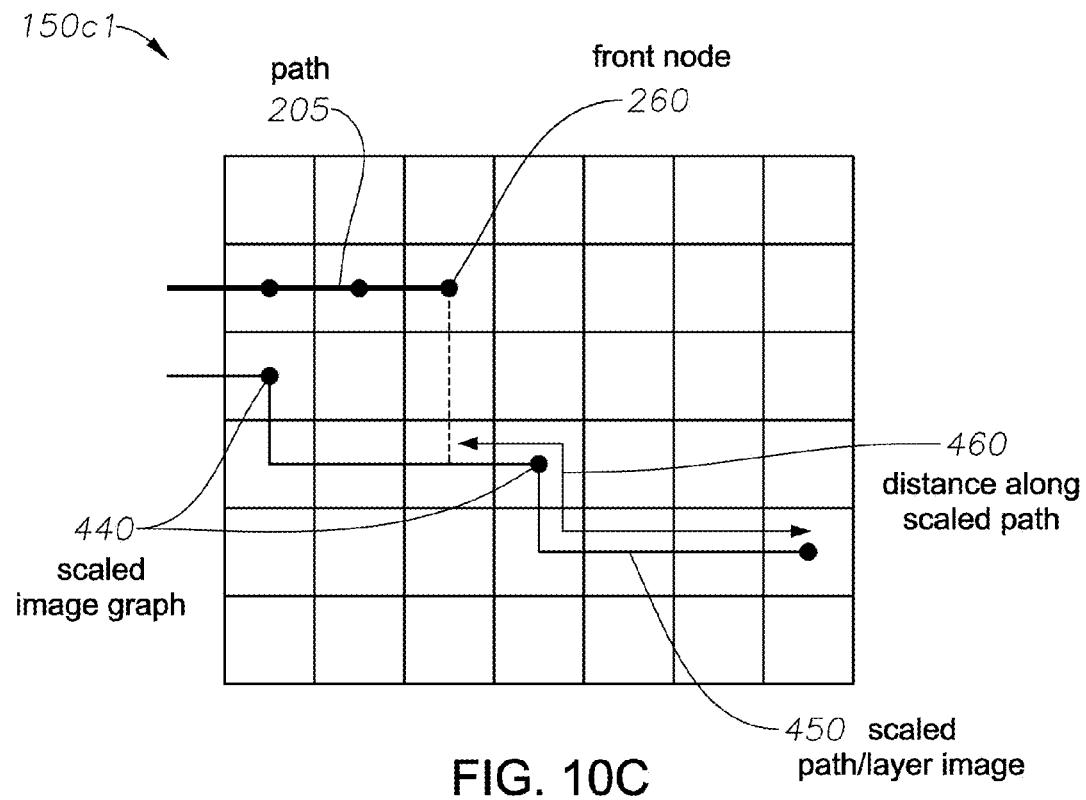

FIG. 10C illustrates that some embodiments 150*c*1 of the assigning step 150*c* of using the scaled path can include generating the scaled image graph 440 that has a lower resolution than the original image graph. The scaled image graph 440 can be created, for example, by selecting a subset of the detected image data 230(*x,y*), or feature image data 240(*x,y*) from the image 200, taken by the imaging system 10. The subset can be selected by coarse graining or decimating the detected image data 230 or the feature image 240. Examples include selecting the detected image data 230 or the feature image data 240 that correspond to every fifth or every tenth pixel, link or node. In FIG. 10C, the scaled image graph is the set of detected image data only for the nodes indicated by black solid dots.

The generating the scaled image graph 440 can be followed by determining a scaled path 450, or scaled layer image 450 with a non-heuristic search of the scaled image graph 440. These steps can be followed by starting the heuristic path search of step 130/330.

FIG. 10C illustrates that within the heuristic search step, the assigning the heuristic costs 150/350 step can include projecting the front node 260 of the path 205 onto the scaled path 450, and using a distance 460 of the projection of the front node 260 from the edge 205 along the scaled path 450 as the heuristic cost of the front node 260. The term "projection" is used here in a broad sense. It can refer to connecting the front node 260 with the scaled path 450 in a variety of ways.

Figure 10D:
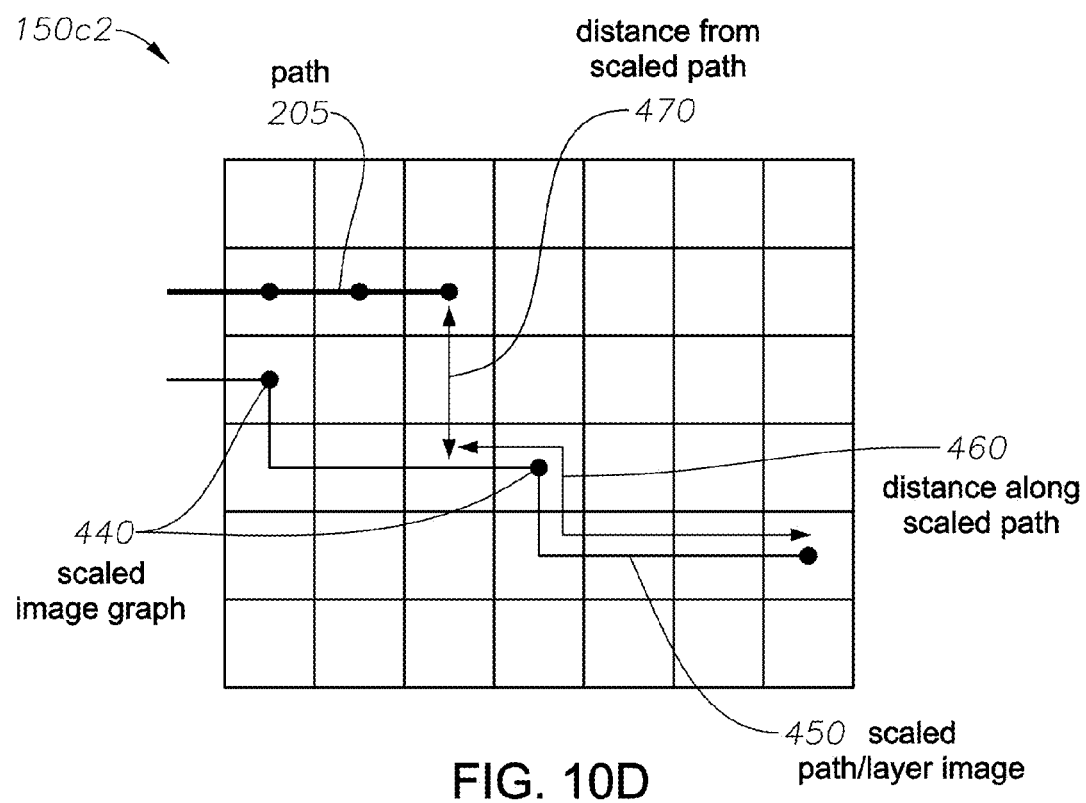

FIG. 10D illustrates a related embodiment 150*c*2, in which the front node 260 is again projected or connected to the scaled path 450. In this embodiment, the heuristic cost is calculated based on the distance 470 of the front node 260 from the scaled path 450. Finally, in some embodiments, the techniques of FIG. 10C and FIG. 10D can be combined and the heuristic cost can be based on the distance 470 of the front node 260 from the scaled path 450 in combination with the distance 460 of the projection of the front node 260 from the edge 205 along the scaled path 450.

In any of the above implementations 150/350/(*a*)-(*c*), prior to performing the heuristic graph search, a calibration step can be performed. The calibration step can include generating a heuristic function table and storing the generated heuristic function table in a suitable memory. During the heuristic search, the pre-stored heuristic function can be read out from the memory.

Figure 11A:
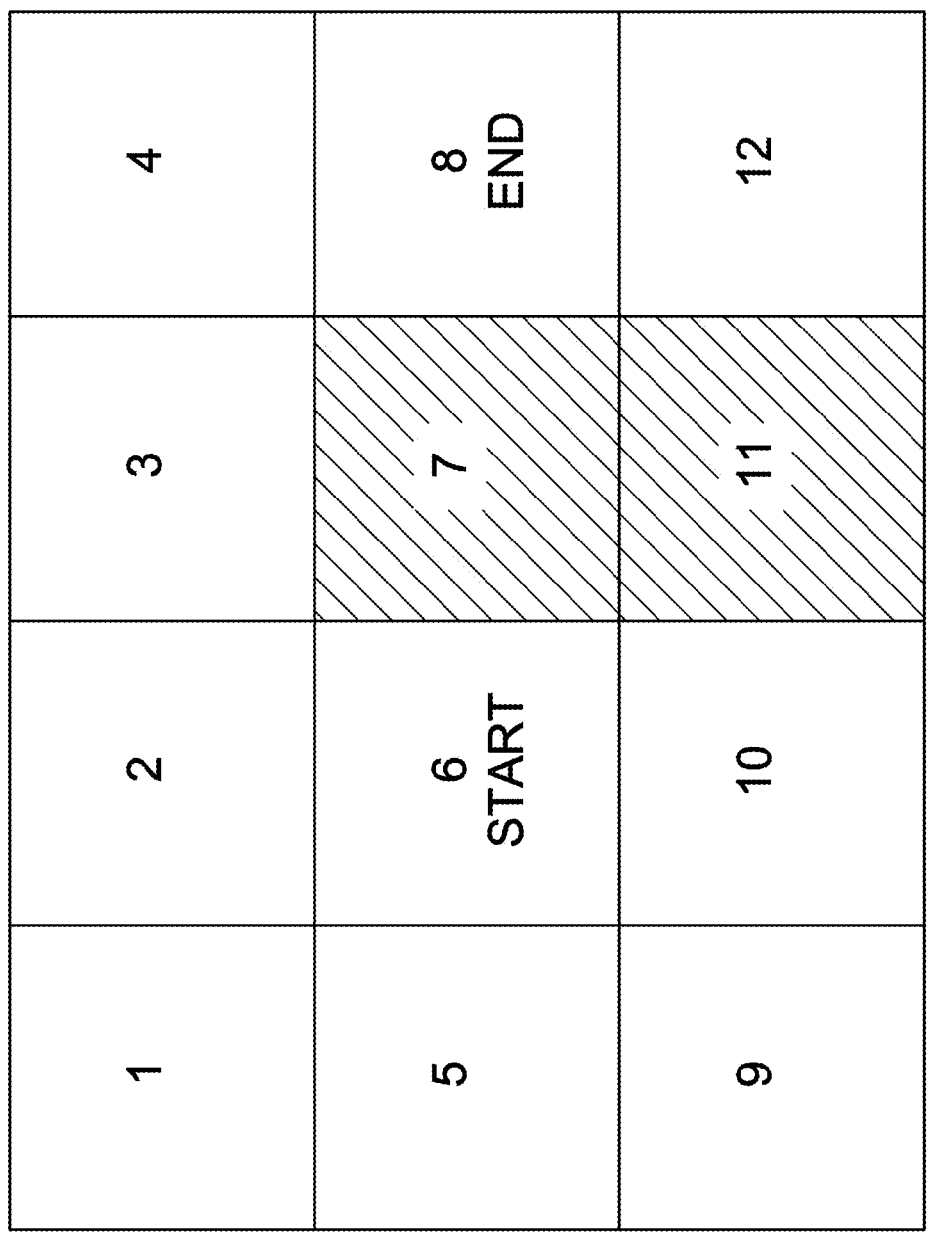
Figures 2, 11B:
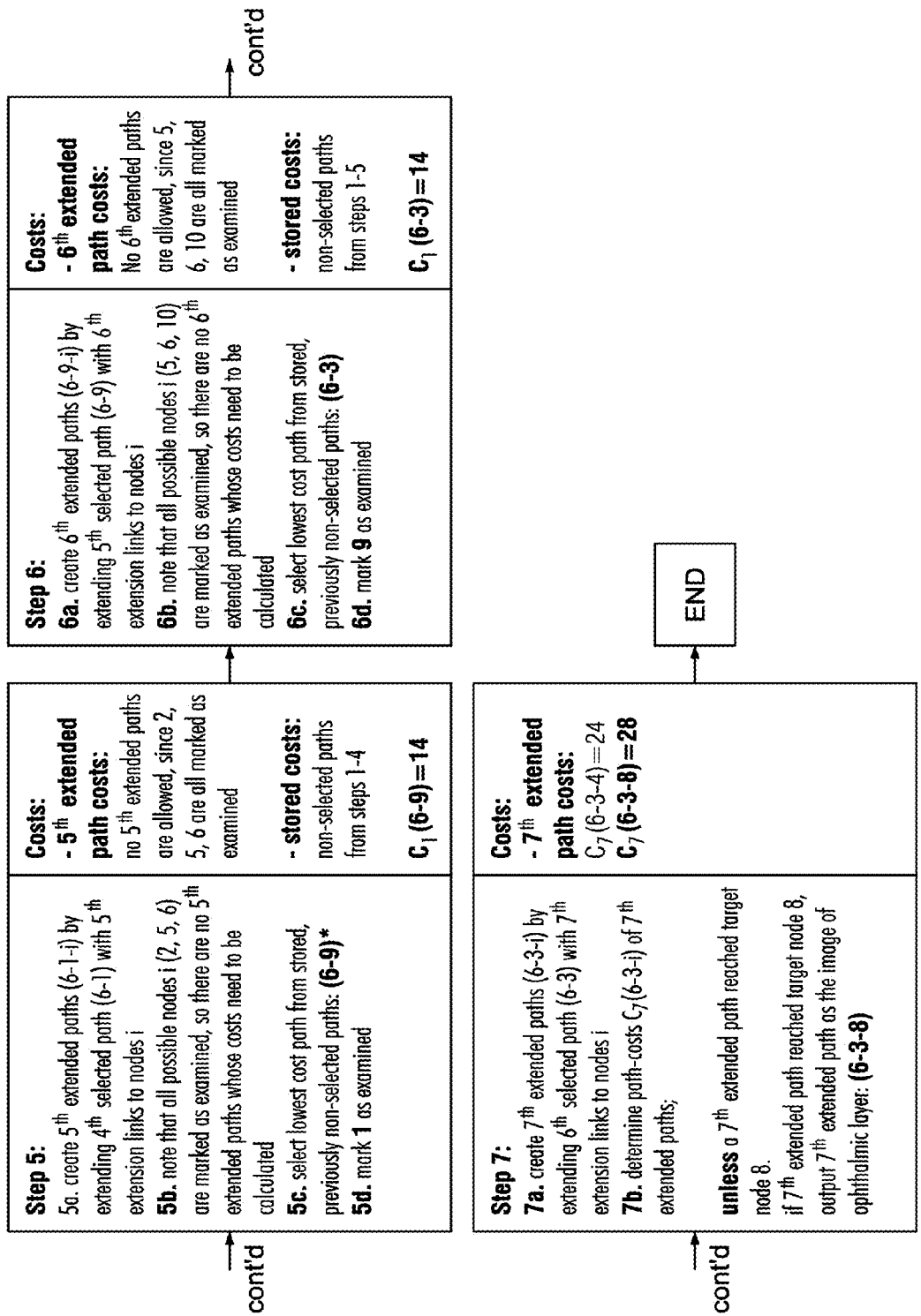
Figure 11C:
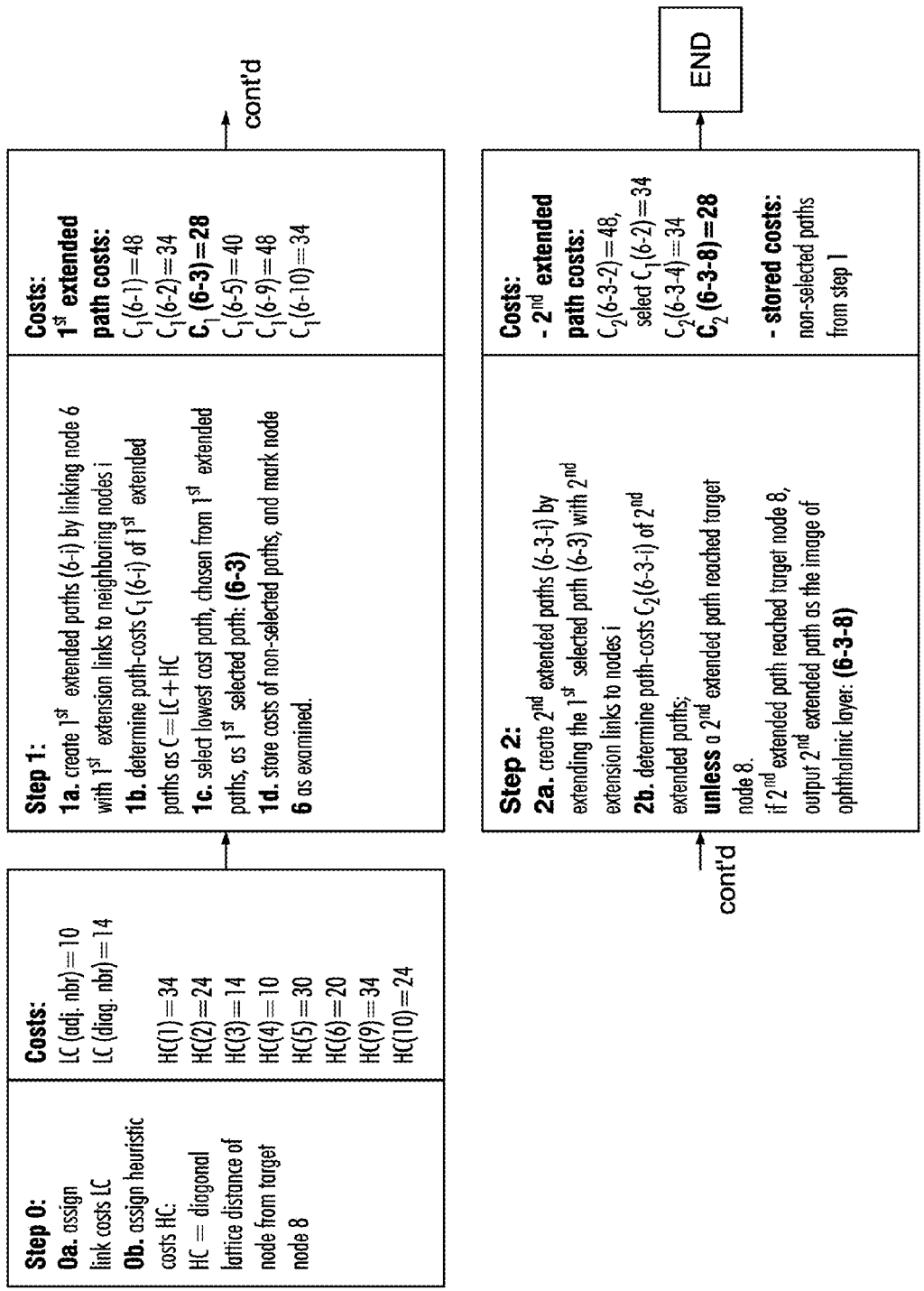

FIGS. 11A-C illustrate an embodiment of the method 100/300. This embodiment is performed on a small array of pixels, numbered 1-12. The heuristic search is directed toward finding a path 205 that connects, for example, starting pixel 6 to ending pixel 8. In this embodiment, the power of the heuristic search is demonstrated in the reduction of the number of steps needed for the heuristic search relative to the number of steps needed for a non-heuristic search. As a particular implementation of the embodiments related to 150*b* or 150*c*, the search in FIGS. 11A-C is directed to finding the path 205 that connects pixel 6 to pixel 8 with the following implementation:

(i) the constructing the image graph 120/320 includes defining links connecting direct neighbors and diagonal neighbors of the array of pixels or nodes;

(ii) the assigning the link costs 140/340 includes assigning the length of the link times 10: direct neighbor link cost=10, diagonal neighbor link cost=14 (square root of 2 being approximated as 1.4), and not using node-costs;

(iii) the assigning the link costs 140/340 also includes assigning link costs to links that connect any pixel to pixels 7 and 11 as prohibitively high. These are examples of the high cost regions discussed earlier.

(iv) the assigning the heuristic costs 150/350 will be described later.

The following abbreviations are introduced: link costs are denoted by LC. Paths are referred to by the nodes they connect: (i-x-j) connects nodes i and j through node x. The path-cost that involves pixels i and j after N iterations is denoted by $C_N(i-j)$, the cost of the path that connects i with j through x is $C_N(i-x-j)$.

FIGS. 11B-1 and 11B-2 illustrate the implementation of steps (a)-(d) without the heuristic costs for comparison purposes. Then FIG. 11C illustrates the same search performed, this time with the heuristic costs also utilized. It will be demonstrated that the heuristic search of FIG. 11C finds the lowest cost path from initial pixel 6 to final pixel 8 much faster.

It is noted that this example is a variant of the search for an edge-to-edge path 205. This implementation is a search for a point-to-point path. However, the comparison of the heuristic and non-heuristic searches can be demonstrated on this example as well.

Aspects of the non-heuristic search include the following. Let us denote the path that resulted from the $N^{th}$ step as (i-x), with its front node 260 being at x. Here, i can refer to a string of nodes, ending in the node i. In the $N^{th}$ storing step 190/390/(d), the costs of the non-selected paths, including the cost of the paths that started from i but ended on a different node j and were not selected, are stored as $C_N(i-j)$.

In the $(N+1)^{st}$ step, new extension links 270 are proposed to extend the $N^{th}$ path from its front node x/260. When executing the selecting step 180/380/(c), the costs of the paths extended from the front node x/260 are compared to the costs of the stored, previously non-selected paths 205n, and the lowest cost path is selected. In this selecting step 180/380/(c), sometimes there may be more than one path with the same lowest cost. In such cases, a selection procedure needs to be adopted. In some implementations, if the cost of the newly extended $(N+1)^{st}$ path (i-x-j) equals the cost of the stored, non-selected $N^{th}$ path (i-j), where these two paths start and end at the same nodes i and j: $C_{(C+1)}(i-x-j)=C_N(i-j)$, then the stored $N^{th}$ path (i-j) is selected instead of the newly provisionally extended path (i-x-j). Obviously, if the cost $C_{(N+1)}(i-x-j)$ of the newly provisionally extended path (i-x-j) is lower than the cost $C_N(i-j)$ of the stored path (i-j), then the newly extended path (i-x-j) is selected. Of course, whichever path is selected as the lowest cost path to connect nodes i and j, the cost of this selected path (i-j) or (i-x-j) still has to be compared to the costs of the other extended and stored paths to select the overall lowest cost path in this $(N+1)^{st}$ selecting step 180/380/(c).

In FIGS. 11 B-C, for each of the $N^{th}$ steps, the costs $C_N$ of the considered paths are listed in a corresponding box. The lowest cost path is indicated by boldfacing the path.

Another aspect of this implementation is that sometimes more than one path can have the same lowest cost even after the previously described selection implementation. In such a situation, a tie-break algorithm can be used. A wide variety of tie break algorithms can be used, as there can be some freedom in selecting this tie break algorithm. In the illustrated example, if two paths have the same costs, then that path is selected whose front node is closest to the upper left corner, labeled 1. If this tie break step produces more than one lowest cost paths, then an additional tie-break step needs to be employed. In some embodiments, such ties can be broken by using a second distance, e.g., the distance from the top edge of the image 200. Other embodiments can employ other first and second tie break rules or distances, including the distance from the left edge or from the right edge of the image. In real applications, the specific tie break procedures are of limited importance, as the costs of the individual links are set by image data or intensity which can take many values and thus it is very rare that two paths would have equal costs, and even rarer that among these equal-cost paths a one-step tie break procedure would not be able to select a single selected path.

In the example below, the selected lowest cost path is indicated by boldface. When this path is selected by a tie-break procedure, then it is indicated by an asterisk *.

The non-heuristic search example of FIG. 11B-1 and FIG. 11B-2 is now described in some detail next.

Step 0: assign link costs

Costs (Step 0): link-cost LC of adjacent neighbor=10; link-cost LC of diagonal neighbor=14.

Step 1:
1a. create $1^{st}$ extended paths (6-i) by linking node 6 with $1^{st}$ extension links to nodes i;
1b. determine path-costs $C_1(6-i)$ of $1^{st}$ extended paths;
1c. select smallest cost path chosen from $1^{st}$ extended paths, as $1^{st}$ selected path: (6-2)*;
1d. store costs of non-selected paths; mark node 6 as examined.

*In step 1c, the costs of paths (6-2), (6-5), and (6-10) were all the same, 10, as shown in the below list of costs. Further, front nodes 2 and 5 even have the same distance from upper left corner node 1. Therefore, both steps of the above described tie break procedure had been employed to select (6-2).

Costs (Step 1):
$1^{st}$ extended path costs:
$C_1(6-1)=14$
$C_1(6-2)=10$
$C_1(6-3)=14$
$C_1(6-5)=10$
$C_1(6-9)=14$
$C_1(6-10)=10$ Step 2:
2a. create $2^{nd}$ extended paths (6-2-i) by extending $1^{st}$ selected path (6-2) with $2^{nd}$ extension links to nodes 1;
2b. determine path-costs $C_2(6-2-i)$ of $2^{nd}$ extended paths; extend path (6-2) to (6-2-i) only if $C_2(6-2-i)<C_1(6-i)$;
2c. select smallest cost path chosen from $2^{nd}$ extended paths and from stored non-selected paths, as $2^{nd}$ selected path: (6-5)*;
2d. store costs of non-selected paths; mark node 2 as examined.

*Path (6-5) and stored path (6-10) have the same lowest cost. The tie break procedure selected the selected path (6-5), as front node 5 is closer to node 1 than node 10.

Costs (Step 2):
$2^{nd}$ extended path costs:
$C_2(6-2-1)=20$, select $C_1(6-1)=14$
$C_2(6-2-3)=20$, select $C_1(6-3)=14$
$C_2(6-2-5)=24$, select $C_1(6-5)=10$
stored path costs: non-selected paths from step 1.

Step 3:
3a. create $3^{rd}$ extended paths (6-5-i) by extending $2^{nd}$ selected path (6-5) with $3^{rd}$ extension links to nodes i;
3b. determine path-costs $C_3(6-5-i)$ of $3^{rd}$ extended paths; extend path (6-5) to (6-5-i) only if $C_3(6-5-i)<C_2(6-i)$;
3c. select smallest cost path chosen from $3^{rd}$ extended paths and stored non-selected paths, as $3^{rd}$ selected path: (6-10);
3d. store costs of non-selected paths; mark node 5 as examined.

Costs (Step 3):
3rd extended path costs:
$C_3(6-5-1)=20$, select $C_1(6-1)=14$
$C_3(6-5-9)=20$, select $C_1(6-9)=14$
$C_3(6-5-10)=24$, select $C_1(6-10)=10$ stored path costs: non-selected paths from steps 1-2.

Step 4:
4a. create 4th extended paths (6-10-i) by extending 3rd selected path (6-10) with 4th extension links to nodes i;
4b. determine path-costs $C_4$(6-10-i) of $4^{th}$ extended paths; extend path (6-10) to (6-10-i) only if $C_4$(6-10-i)<$C_3$(6-i);
4c. select smallest cost path chosen from $4^{th}$ extended paths and stored non-selected paths, as $4^{th}$ selected path: (6-1)*;
4d. store costs of non-selected paths; mark node 10 as examined.

*There are again two lowest cost paths: stored paths (6-9) and (6-1). Front node 1 being closer to the upper left corner (in fact coinciding with it), path (6-1) is selected by the above tie break procedure in the selecting step 180/380/(c).

Costs (Step 4):
$4^{th}$ extended paths:
$C_4$(6-10-9)=24, select $C_1$(6-9)=14
stored path costs: non-selected paths from steps 1-3, including $C_1$(6-1)=14.

Step 5:
5a. create $5^{th}$ extended paths (6-1-i) by extending $4^{th}$ selected path (6-1) with $5^{th}$ extension links to nodes i;
5b. note that all possible nodes i (2, 5, 6) are marked as examined, so there are no $5^{th}$ extended paths whose costs need to be calculated;
5c. select lowest cost path from stored, previously non-selected paths: (6-9)*;
5d. mark 1 as examined.

*Again, there are two lowest cost paths (6-3) and (6-9). The tie break procedure selected (6-9).

Costs (Step 5):
$5^{th}$ extended path costs:
no $5^{th}$ extended paths are allowed, since all nodes that can be connected to node 1: 2, 5, 6 were all already marked as examined.
stored costs: non-selected paths from steps 1-4.
$C_1$(6-9)=14.

Step 6:
6a. create $6^{th}$ extended paths (6-9-i) by extending $5^{th}$ selected path (6-9) with $6^{th}$ extension links to nodes i;
6b. note that all possible nodes i (5, 6, 10) are marked as examined, so there are no $6^{th}$ extended paths whose costs need to be calculated;
6c. select lowest cost path from stored, previously non-selected paths: (6-3);
6d. mark 9 as examined.

Costs (Step 6):
$6^{th}$ extended path costs:
no $6^{th}$ extended paths are allowed, since 5, 6, 10 are all marked as examined
stored costs:
non-selected paths from steps 1-5.
$C_1$(6-3)=14

Step 7:
7a. create $7^{th}$ extended paths (6-3-i) by extending $6^{th}$ selected path (6-3) with $7^{th}$ extension links to nodes i;
7b. determine path-costs $C_7$(6-3-i) of $7^{th}$ extended paths; unless one of the $7^{th}$ extended paths reached target node 8. If a $7^{th}$ extended path reached target node 8, output/report $7^{th}$ extended path as the image of ophthalmic layer: (6-3-8).

Costs (Step 7): (Since the extended path (6-3-8) reached the target node 8, no cost-based selection needs to be performed, so these costs are just given for completeness):
$7^{th}$ extended path costs:
$C_7$(6-3-4)=24
$C_7$(6-3-8)=28.

FIGS. 11B-1 and FIG. 11B-2 illustrate that the non-heuristic search requires performing 16 path-cost evaluations to find the (6-8) path with the lowest cost. This is path (6-3-8) with a cost $C_3$(6-3-8)=28.

FIG. 11C contrasts this non-heuristic search with an embodiment of the heuristic search method 100/300. Here the cost determination involves adding a heuristic cost HC to the link costs LC. In this implementation, the heuristic costs are assigned with a mix of embodiments 150a and 150b in FIG. 9: the HC of an extension link 220 is set by the "Diagonal distance" of the end node of the extension link 220 from the target node 8. The Diagonal distance of the nodes can be calculated at least two ways:

(i) Determining the lowest cost path between the node and the target node, assigning 10 to every horizontal or vertical link, and 14 to every diagonal link.

(ii) Calculating: dx=|node(x)−target(x)|, dy=|node(y)−target(y)|, and HC=10*(dx+dy)−6*min(dx, dy). Here, node (x) refers to the x coordinate of the node, target(x) refers to the x coordinate of the target node, |...| refers to taking the absolute value of the argument ..., and min(dx, dy) refers to taking the smaller of dx and dy. These two procedures are equivalent as they assign the same HC to each node.

As described above, these heuristic costs can be pre-calculated and stored so that during the actual search these HC values just need to be recalled from memory. In other implementations, it is possible to calculate the HC values as part of performing the search process, "in real time". A processor and a memory of the image processor 30 can be used for this purpose.

Once the HC of its end node is assigned to each link as its HC, the link HC is then combined with the link cost of the same link with simple summing, or equivalently, with a weight factor α=1. We note that for simplicity, in the calculation of the Diagonal distance, the links 7 and 11 are not excluded.

We demonstrate this procedure of assigning heuristic costs HC on the example of FIG. 11A. For example, HC(1)=34, because the Diagonal distance of node 1 from node 8 equals 10*(3+1)−6*min(3, 1)=34 according to method (ii). This of course equals 10+10+14, the HC by method (i).

Once the HC values are assigned, the path costs can be determined as well. For example, using method (i), C(6-1)=48, because the cost of the (6-1) diagonal link is 14, and this is added to HC(1)=34, the HC of the end node of the (6-1) link, node 1. In another example, C(6-9)=48, because the link cost for the (6-9) diagonal link is 14, and HC(9)=34, through 10*(3+1)−6*min(3, 1)=34. Here, the lowest cost path between 9 and the target node 8 was determined by going through the forbidden node 11 or 7.

FIG. 11C illustrates the search method when the heuristic costs are also used to guide the search. Its steps will be described in some detail next.

Step 0:
0a. assign link costs LC
0b. assign heuristic costs HC: HC=diagonal lattice distance of node from target node 8

Costs:
LC (adj. nbr)=10
LC (diag. nbr)=14
and
HC(1)=34
HC(2)=24
HC(3)=14
HC(4)=10
HC(5)=30
HC(6)=20
HC(9)=34
HC(10)=24
Step 1:
1a. create $1^{st}$ extended paths (6-i) by linking node 6 with $1^{st}$ extension links to neighboring nodes i;
1b. determine path-costs $C_1$(6-i) of $1^{st}$ extended paths as C=LC+HC;
1c. select lowest cost path, chosen from $1^{st}$ extended paths, as $1^{st}$ selected path: (6-3);
1d. store costs of non-selected paths, and mark node 6 as examined.
Costs (Step 1):
$1^{st}$ extended paths cost:
$C_1$(6-1)=48
$C_1$(6-2)=34
$C_1$(6-3)=28
$C_1$(6-5)=40
$C_1$(6-9)=48
$C_1$(6-10)=34
Step 2:
2a. create $2^{nd}$ extended paths (6-3-i) by extending the $1^{st}$ selected path (6-3) with $2^{nd}$ extension links to nodes i;
2b. determine path-costs $C_2$(6-3-i) of $2^{nd}$ extended paths; unless a $2^{nd}$ extended path reached target node 8. If $2^{nd}$ extended path reached target node 8, output $2^{nd}$ extended path as the image of ophthalmic layer: (6-3-8).
Costs (Step 2):
$2^{nd}$ extended path costs:
$C_2$(6-3-2)=48,
  select $C_1$(6-2)=34
$C_2$(6-3-4)=34
$C_2$(6-3-8)=28
  stored path costs:
non-selected paths from step 1.

FIG. 11C illustrates that the heuristic path search by the method 100/300 required the calculation of only 9 path-costs instead of the 16 path cost calculation required by the non-heuristic method of FIG. 11B-1 and FIG. 11B-2.

This is a substantial reduction of the computational time and demand for the imaging system 10 and its image processor 30 in particular and thus demonstrates a substantial advantage of the heuristic methods 100/300 over the non-heuristic methods.

Figure 12:
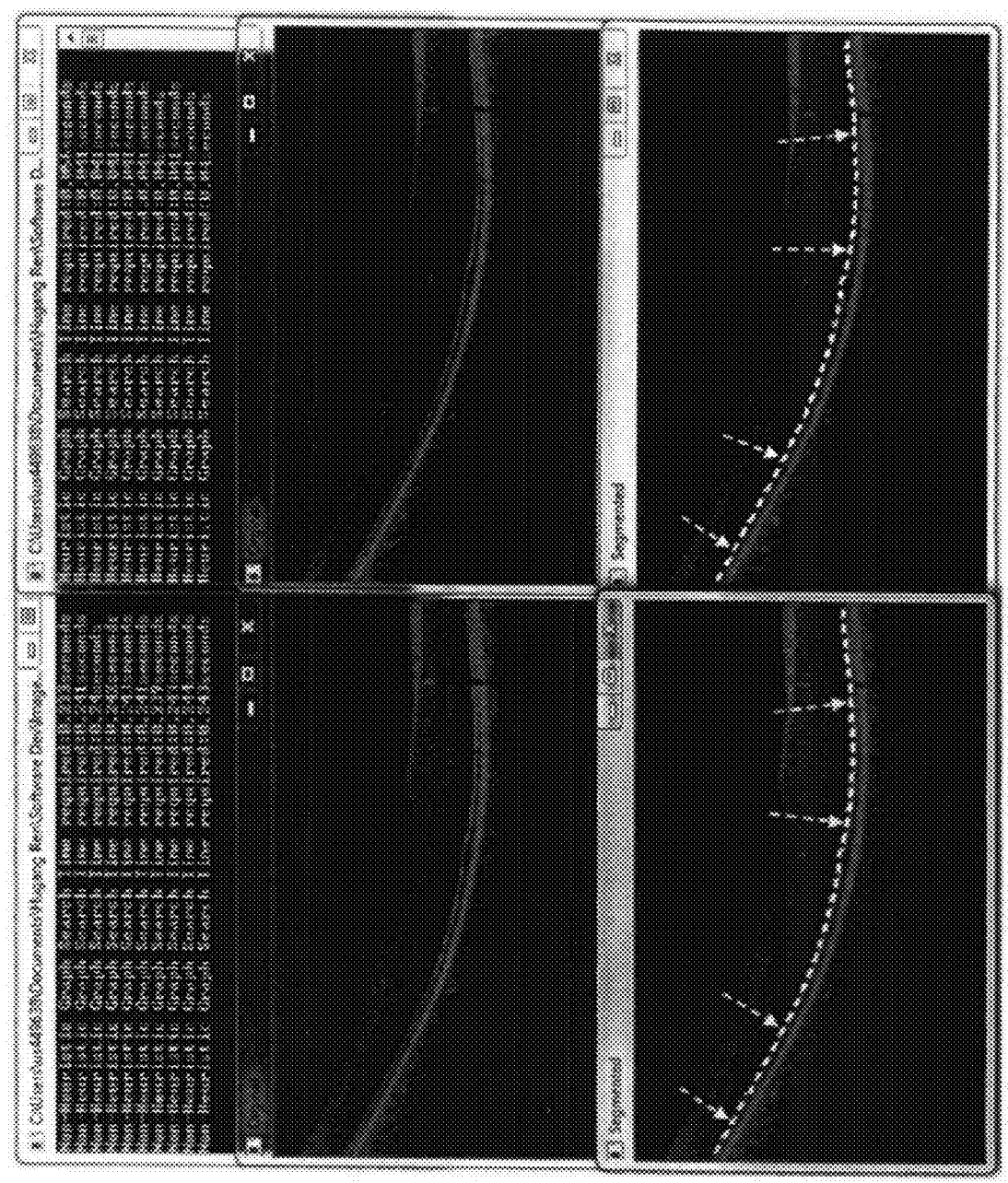
FIG. 12 shows screenshots of the image segmenting achieved by the method 100/300.

FIG. 12 shows screenshots of the diagnostics of path searches on an OCT image. The size of the image 200 was 1500×550 pixels. The image processor 30 involved a Lenovo D30 workstation running a Windows 7 operating system on two Intel Xeon processors. The left panel show that a non-heuristic path search required 0.24 seconds, whereas the right panel shows that a heuristic path search, according to embodiments of the method 100/300 with essentially equivalent precision required only 0.04 seconds. The same computational processor was used in the image processor 20 for both searches. This six-fold decrease in computational time is a substantial advantage of the method 100/300.

It is noted here that one of the type of image targets for which the method 100/300 works particularly well are layers, such as ophthalmic layers, or another extended objects. A common aspect of these layer imaging targets is the target being oriented, directed, smooth, or extending from edge-to-edge of the image. For such targets, the above embodiments of the heuristic cost increase the efficiency of the search substantially.

While this specification contains many specifics, these should not be construed as limitations on the scope of the invention or of what can be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

The invention claimed is:

1. A method of processing an ophthalmic image, the method comprising:
  detecting image data of an ophthalmic region involving an ophthalmic layer by an imaging system;
  constructing an image graph, comprising nodes connected by links and the detected image data corresponding to at least one of the nodes and links, by an image processor from the image; and
  performing a heuristic graph-search for a path on the image graph that corresponds to an image of the ophthalmic layer by
    assigning at least one of link-costs to links of the image graph and node-costs to nodes of the image graph;
    assigning heuristic-costs to at least one of the nodes and the links of the image graph, wherein assigning heuristic-costs comprises:
      determining a distance of the at least one of a node and a link from an edge of the image by the image processor; and
      defining the heuristic cost of at least one of the node and the link as a function of the determined distance;
    (a) creating extended paths by extending a selected path from its front node with extension links;
    (b) determining path-costs of the extended paths by combining heuristic costs of the extended paths with chain costs of the extended paths, wherein the heuristic cost of a path is the heuristic cost of its front node, and the chain cost of a path is one of a sum of the link-costs of the links of the path, a sum of the node-costs of the nodes of the path, and a weighted sum of the link-costs and node-costs of the links and nodes of the path;
    (c) selecting a lowest cost path, chosen from the extended paths and from stored non-selected paths, as an updated selected path; and
    (d) storing non-selected extended paths and their costs, and marking the front node of the selected path as examined; wherein
  the steps (a)-(d) are repeated iteratively.

2. The method of claim 1, the constructing the image graph comprising:

receiving detected image data of the ophthalmic region from the imaging system; and
generating feature image data from the detected image data by the image processor, wherein
the feature image data correspond to at least one of an intensity, a phase, a gradient and a texture of the detected image data; and
the performing the heuristic graph search comprises using the feature image data to determine the heuristic costs and at least one of the link-costs and node-costs.

3. The method of claim 2, wherein:
the detected image data is associated with at least one of an image intensity, a polarization state, a color, and a phase of a detected imaging light.

4. The method of claim 2, wherein:
the constructing the image graph comprises defining
the nodes of the graph to correspond to pixels of the imaging system, and
the links of the graph as links connecting the nodes;
the generating the feature image data comprises
associating one of an intensity and a phase of the detected image data with the pixels that detected the image data, and
evaluating a gradient of the one of the intensity and the phase of the detected image data between pairs of nodes, and
the assigning link-costs to the links comprises
assigning link-costs to the links connecting the pairs of nodes that decrease when the gradient increases.

5. The method of claim 4, wherein:
the pair of nodes includes at least one of
nearest neighbor pixels, diagonally neighboring pixels and pixels separated by a distance smaller than a cutoff distance.

6. The method of claim 1, the determining the path-costs of extended paths comprising:
calculating a change of the heuristic-cost of the selected path, and calculating a change of the chain-cost of the selected path, both caused by extending the selected path with the extension links; and
determining the path-costs of the extended paths by updating the path-cost of the selected path with a combination of the change of the heuristic cost and the change of the chain-cost.

7. The method of claim 1, the selecting a lowest cost path comprising:
using a tie-breaking algorithm when more than one of the extended paths and stored non-selected paths have the same path-costs.

8. The method of claim 1, the method comprising:
repeating steps (a)-(d) to update the selected path until an end-criterion is reached; and
identifying the updated selected path as corresponding to the image of the ophthalmic layer.

9. The method of claim 1, the combining heuristic-costs with the chain-costs comprising:
adding the heuristic-costs of the extended paths to the chain-costs of the extended paths with a weight factor.

10. The method of claim 1, the assigning the heuristic-cost comprising:
creating a layer image of the ophthalmic layer based on a previously recorded layer image of the ophthalmic layer by the image processor; and
defining the heuristic cost of at least one of the node and the link based on a path-length from at least one of the node and the link to an edge of the image along the determined layer image.

11. The method of claim 10, comprising:
registering the previously recorded layer image to the ophthalmic image.

12. The method of claim 1, the assigning the heuristic-cost comprising:
generating a heuristic function table as part of a calibration prior to performing the heuristic graph-search;
storing the generated heuristic function table in a memory; and
recalling the stored heuristic function table from the memory to be used for the assigning the heuristic cost.

13. The method of claim 1, the assigning the heuristic-cost comprising:
generating a scaled image graph with a first resolution lower than a resolution of the image graph;
performing a non-heuristic graph-search for the path on the scaled image graph to determine a scaled path; and
assigning the heuristic-costs of the heuristic graph search using the scaled path.

14. The method of claim 13, the assigning the heuristic-costs of the heuristic graph search using the scaled path comprising:
using a distance of the at least one of the nodes and the links of the image graph from an edge of the image along the scaled path.

15. The method of claim 13, the using a distance comprising:
combining a distance of the at least one of the nodes and the links of the image graph from the scaled path with the used distance.

16. The method of claim 13, the generating the scaled image graph comprising:
generating the scaled image graph from the image taken by the imaging system by at least one of coarse graining and decimating.

17. The method of claim 1, wherein:
the imaging system comprises an Optical Coherence Tomography (OCT) system.

18. The method of claim 1, wherein:
the imaging system comprises an ultrasound system.

19. The method of claim 1, wherein:
the imaging system comprises a scheimpflug system.

20. The method of claim 1, the taking an image comprising:
pre-processing the image taken by the imaging system by at least one of associating a pseudo-color, adjusting a contrast, adjusting a brightness,
filtering, normalizing, implementing a noise-reduction, enhancing an image data,
and implementing a histogram-equalization.

21. The method of claim 1, wherein:
the method is performed on an image of the ophthalmic layer, wherein the image is one of oriented, directed, smooth, and extending from edge-to-edge of the image.

22. A method of processing an ophthalmic image, the method comprising:
detecting image data of an ophthalmic region involving an ophthalmic layer by an imaging system;
using an image processor to construct an image graph, comprising nodes connected by links and the detected image data corresponding to at least one of the nodes and links, from the image; and
performing a heuristic graph-search for a path on the image graph that corresponds to an image of the ophthalmic layer by
assigning at least one of link-costs to links of the image graph and node-costs to nodes of the image graph;

assigning heuristic-costs to at least one of the nodes and the links of the image graph, wherein assigning heuristic-costs comprises:
  determining a distance of the at least one of a node and a link from an edge of the image by the image processor; and
  defining the heuristic cost of at least one of the node and the link as a function of the determined distance;
(a) creating $(N+1)^{st}$ extended paths by extending an $N^{th}$ selected path from its $N^{th}$ front node with $(N+1)^{st}$ extension links;
(b) determining path-costs of the $(N+1)^{st}$ extended paths by combining at least one of link-costs and node-costs of the $(N+1)^{st}$ extended paths with heuristic costs of the $(N+1)^{st}$ extended paths, wherein the heuristic cost of a path is the heuristic cost of its front node, the link-cost of the path is a sum of the link-costs of the links of the path and the node-cost of the path is a sum of the node-costs of the nodes of the path; and
(c) selecting a smallest cost path, chosen from the $(N+1)^{st}$ extended paths and from stored non-selected paths, as the $(N+1)^{st}$ selected path; and
(d) storing $(N+1)^{st}$ non-selected paths and their costs, and marking the $N^{th}$ front node as examined, wherein
the method comprises repeating steps (a)-(d) iteratively.

* * * * *